(12) United States Patent
Sporck et al.

(10) Patent No.: US 11,650,644 B2
(45) Date of Patent: May 16, 2023

(54) UNIVERSAL SERIAL BUS (USB) TYPE-C AND POWER DELIVERY PORT WITH SCALABLE POWER ARCHITECTURE

(71) Applicant: QUALCOMM Incorporated, San Diego, CA (US)

(72) Inventors: Christian Gregory Sporck, Campbell, CA (US); Georgios Konstantinos Paparrizos, Foster City, CA (US); Chunping Song, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/445,324

(22) Filed: Aug. 18, 2021

(65) Prior Publication Data

US 2021/0382535 A1 Dec. 9, 2021

Related U.S. Application Data

(62) Division of application No. 15/649,939, filed on Jul. 14, 2017, now Pat. No. 11,112,844.

(Continued)

(51) Int. Cl.
*G06F 1/26* (2006.01)
*G06F 13/42* (2006.01)
(Continued)

(52) U.S. Cl.
CPC ............ *G06F 1/266* (2013.01); *G06F 13/385* (2013.01); *G06F 13/4022* (2013.01);
(Continued)

(58) Field of Classification Search
CPC . G06F 1/26; G06F 13/28; G06F 13/42; G06F 13/40; G06F 1/266; G06F 13/4295;
(Continued)

(56) References Cited

U.S. PATENT DOCUMENTS 8,909,842 B2 12/2014 Johnson
9,535,117 B2 1/2017 Menon et al.
(Continued)

FOREIGN PATENT DOCUMENTS

WO WO-2017083831 A1 * 5/2017 ............. G06F 1/266

OTHER PUBLICATIONS

Cypress EZ., et al., "EZ-PD CCG2 Datasheet USB Type-C Port Controller", Aug. 2, 2016, XP055421078, Retrieved from the Internet: URL:http://www.cypress.com/file/140151/download [retrieved on Nov. 2, 2017], 33 pages.

(Continued)

*Primary Examiner* — Henry Tsai
*Assistant Examiner* — Christopher A Daley
(74) *Attorney, Agent, or Firm* — Holland & Hart LLP/Qualcomm

(57) ABSTRACT

A Universal Serial Bus (USB) Type-C and power delivery port with scalable power architecture is disclosed. In one aspect, at least two circuits for a USB port are consolidated into a single integrated circuit (IC). At least one of the at least two circuits is part of a Type-C port controller (TCPC) group of circuits including sensors associated with detecting whether a voltage and current are present at pins of a USB receptacle. At least the other one of the at least two circuits is selected from a battery-related group of circuits including a battery charging circuit, an over-voltage protection circuit, and a conditioning circuit. The more circuitry integrated into the single IC the more readily scalable the end product is for a multi-port device. Additional circuitry such as a light emitting diode (LED) driver may also be included in the single IC.

30 Claims, 16 Drawing Sheets

Related U.S. Application Data

(60) Provisional application No. 62/510,304, filed on May 24, 2017.

(51) Int. Cl.
*G06F 13/38* (2006.01)
*G06F 13/40* (2006.01)

(52) U.S. Cl.
CPC ...... *G06F 13/4081* (2013.01); *G06F 13/4282* (2013.01); *G06F 13/4295* (2013.01); *G06F 2213/0042* (2013.01)

(58) Field of Classification Search
CPC .............. G06F 13/385; G06F 13/4081; G06F 13/4282; G06F 13/4022
See application file for complete search history.

(56) References Cited

U.S. PATENT DOCUMENTS

| | | |
|---|---|---|
| 9,727,123 B1 | 8/2017 | Nayak et al. |
| 10,338,656 B1 | 7/2019 | Nayak et al. |
| 10,387,345 B2 | 8/2019 | Waters |
| 10,692,674 B2 | 6/2020 | Waters |
| 11,416,054 B2 | 8/2022 | Nayak et al. |
| 2010/0073837 A1 | 3/2010 | Predtetchenski et al. |
| 2011/0234172 A1 | 9/2011 | Kung et al. |
| 2012/0198119 A1 | 8/2012 | Johnson et al. |
| 2013/0088188 A1 | 4/2013 | Romanenko |
| 2015/0069956 A1 | 3/2015 | Hu et al. |
| 2015/0121095 A1 | 4/2015 | Tsai et al. |
| 2015/0137861 A1 | 5/2015 | Cornelius et al. |
| 2015/0331826 A1 | 11/2015 | Ghosh et al. |
| 2016/0179648 A1 | 6/2016 | Srivastava et al. |
| 2016/0188514 A1 | 6/2016 | Forghani-Zadeh et al. |
| 2016/0268731 A1 | 9/2016 | Ziegenfuss et al. |
| 2016/0306771 A1 | 10/2016 | Chen et al. |
| 2016/0308527 A1 | 10/2016 | Kim et al. |
| 2016/0378704 A1 | 12/2016 | Adamson et al. |
| 2017/0046289 A1 | 2/2017 | Hundal et al. |
| 2017/0140887 A1 | 5/2017 | Waters |
| 2018/0275738 A1 | 9/2018 | Pawar et al. |
| 2018/0323563 A1 | 11/2018 | Xu |
| 2018/0341309 A1 | 11/2018 | Sporck et al. |
| 2022/0263278 A1 | 8/2022 | Kim |

OTHER PUBLICATIONS

Enos N., et al., "A Primer on USB Type-C and Power Delivery Applications and Requirements", Nov. 1, 2016, XP055513109, United States Retrieved from the Internet: URL:http://www.ti.com/lit/wp/slyy109/slyy109.pdf [retrieved on Oct. 8, 2018], 17 pages.
International Preliminary Reporton Patentability for PCT/US2018/032896, dated Dec. 5, 2019, 15 pages, (172817WO).
International Search Report and Written Opinion—PCT/US2018/032896—ISA/EPO—dated Oct. 25, 2018 (172817WO).
Invitation to Pay Additional Fees and, Where Applicable, Protest Fee and Partial International Search Report for PCT/US2018/032896, dated Sep. 3, 2018, 14 pages.
Montag B., et al., "USB Power Delivery Specification Revision 1.0 Universal Serial Bus Power Delivery Specification", Jul. 5, 2012, XP055457550, Retrieved from the Internet: URL:http://caxapa.ru/thumbs/342141/USB_PD_V1_0-20120705-final.pdf [retrieved on Mar. 8, 2018], 303 pages.

\* cited by examiner

# UNIVERSAL SERIAL BUS (USB) TYPE-C AND POWER DELIVERY PORT WITH SCALABLE POWER ARCHITECTURE

PRIORITY CLAIM

The present application is a Divisional of U.S. patent application Ser. No. 15/649,939 by Sporck et al., entitled "UNIVERSAL SERIAL BUS (USB) TYPE-C AND POWER DELIVERY PORT WITH SCALABLE POWER ARCHITECTURE," filed Jul. 14, 2017, which claims priority to U.S. Patent Provisional Application Ser. No. 62/510,304 by Sporck et al., entitled "UNIVERSAL SERIAL BUS (USB) TYPE-C AND POWER DELIVERY PORT WITH SCALABLE POWER ARCHITECTURE," filed on May 24, 2017; each of which is assigned to the assignee, the contents of which is incorporated herein by reference in its entirety.

BACKGROUND

I. Field of the Disclosure

The technology of the disclosure relates generally to computing devices having a Universal Serial Bus (USB) port.

II. Background

Computing devices have become ubiquitous in modern society. Initially, computing devices were generally proprietary and designed to work only with peripherals that conformed to proprietary form factors and proprietary signaling protocols. While such approach allowed for some specialized niche functions to be instantiated, market forces resisted such proprietary approaches and the various devices converged onto relatively few operating systems and communication protocols.

One popular standard that defines a communication protocol with accompanying form factors for connectors and receptacles used with cables to interconnect devices is the Universal Serial Bus (USB) standard. USB Implementers Forum, Inc. has promulgated a "Type-C" connector and receptacle that expands the capabilities of USB cables while maintaining a relatively small form factor. USB in general has received widespread acceptance as a format through which devices may communicate and has seen increasing use as a power delivery mechanism. Currently proposed devices may now operate as both a power source capable of providing power to a second device through a USB cable and also as a power sink capable of receiving power from a second device, such as for charging a battery.

Many computing devices such as desktop computers already have multiple USB receptacles. Recent trends suggest that mobile computing devices such as phablets, tablets, thin computing devices, laptops, and the like will likewise begin to include multiple USB receptacles. Likewise, the trend of mobile computing devices receiving power through a USB port may also extend to other computing devices such that the traditional barrel jack that has historically been used to provide power to computing devices may be eliminated. Taken together, the result is a device with multiple USB ports, each potentially capable of acting as a power source or a power sink. While such flexibility is laudable in many contexts, each port requires a Type-C port controller, over-voltage protection, surge protection, and USB charger detection. Such elements impose an area penalty within the computing device and are not scalable. Still further conflicts may arise between different ports where multiple ports try to act as power sinks concurrently or excessive power is provided by power source ports.

In short, with the proliferation of USB Type-C ports a more elegant solution to managing a USB Type-C port may be desirable.

SUMMARY OF THE DISCLOSURE

Aspects disclosed in the detailed description include a Universal Serial Bus (USB) Type-C and power delivery port with scalable power architecture. Exemplary aspects consolidate at least two circuits for a USB Type-C port into a single integrated circuit (IC). At least one of the at least two circuits is part of a Type-C port controller (TCPC) group of circuits including sensors associated with detecting whether a voltage and current are present at pins of a USB receptacle. At least the other one of the at least two circuits is selected from a battery-related group of circuits including a battery charging circuit, an over-voltage protection circuit, and a conditioning circuit. The more circuitry integrated into the single IC the more readily scalable the end product is for a multi-port device. Additional circuitry such as a light emitting diode (LED) driver may also be included in the single IC. One such single IC may be used for each USB Type-C port within a computing device. This scalable architecture allows a battery field effect transistor (FET) to be shared by all battery charging circuitry, which reduces costs and eases layout constraints on a circuit board. Still another option is consolidation of charging arbitration between multiple ones of the single IC to control which charger is active and also control which of the single ICs is the master.

In this regard in one aspect, an IC is disclosed. The IC includes a plurality of input pins including at least a first Vbus pin, a second Vbus pin, a first command and control (CC) pin, a second CC pin, and a data signal pin. The IC also includes a first circuit including a USB port controller circuit including a Vbus and CC detection circuit coupled to the first and second Vbus pins and the first and second CC pins, a power deliver (PD) physical layer (PHY) (PD PHY) circuit, and a data signal detection circuit coupled to the data signal pin. The IC also includes a second circuit including a battery charger circuit, an over-voltage protection circuit, and a signal conditioning circuit.

In another aspect, a computing device is disclosed. The computing device includes a first USB receptacle including a USB Type-C receptacle. The computing device also includes a first port circuit coupled to the first USB receptacle. The first port circuit includes a plurality of input pins including at least a first Vbus pin, a second Vbus pin, a first CC pin, a second CC pin, and a data signal pin. The first port circuit also includes a first circuit including a USB port controller circuit including a Vbus and CC detection circuit coupled to the first and second Vbus pins and the first and second CC pins, a PD PHY circuit, and a data signal detection circuit coupled to the data signal pin. The first port circuit also includes a second circuit including a battery charger circuit, an over-voltage protection circuit, and a signal conditioning circuit. The computing device also includes a second USB receptacle. The computing device also includes a second port circuit coupled to the second USB receptacle.

In another aspect, a buck-boost conditioning circuit is disclosed. The buck-boost conditioning circuit includes an integrated FET configured to be coupled to a multi-cell battery.

In another aspect, a method of operating a multi-port USB device is disclosed. The method includes detecting insertion at a first USB port. The method also includes determining if the first USB port is operating in a sink mode. The method also includes, if the first USB port is not operating in the sink mode, placing the first USB port in a source mode. The method also includes, when the first USB port is operating in the source mode, advertising power and providing power. The method also includes, if the first USB port is operating in the sink mode, advertising power. The method also includes precluding other USB ports from operating as power sinks when the first USB port is operating in the sink mode.

In another aspect, a consolidated IC is disclosed. The consolidated IC includes a USB port circuit. The consolidated IC also includes a battery charger circuit including a buck-boost circuit. The consolidated IC also includes a battery FET configured to couple to a battery pack circuit having at least two serially-arranged battery cells.

In another aspect, a consolidated IC is disclosed. The consolidated IC includes a USB port circuit. The consolidated IC also includes a battery charger circuit including a buck-boost circuit. The consolidated IC also includes an integrated sense resistor configured to couple to a battery pack circuit having at least two serially-arranged battery cells.

DETAILED DESCRIPTION

Figure 1:
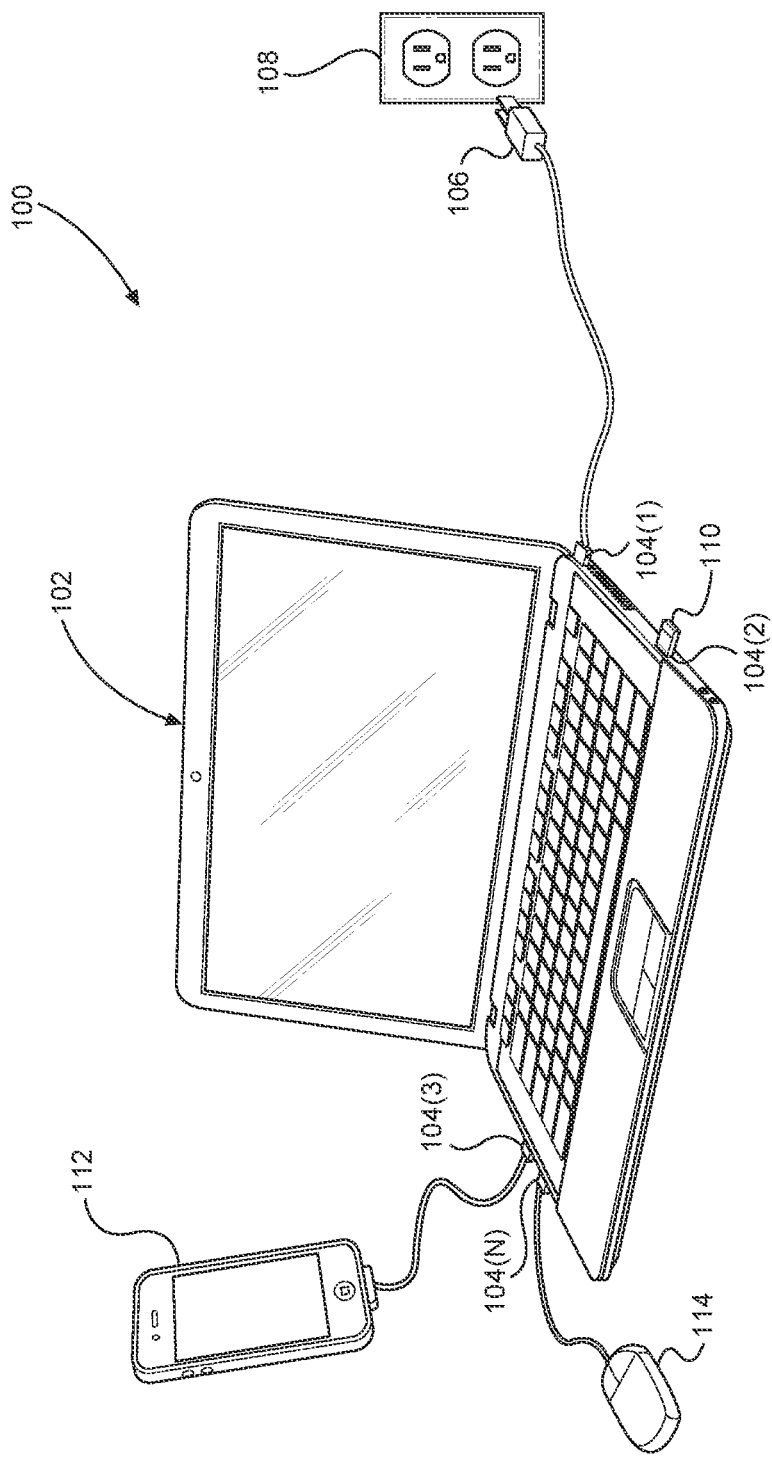
FIG. 1 is a simplified illustration of a computing device having multiple Universal Serial Bus (USB) Type-C ports, each capable of acting as a power source or a power sink with USB Type-C cables plugged into the USB Type-C ports along with associated peripherals.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a Universal Serial Bus (USB) Type-C and power delivery port with scalable power architecture. Exemplary aspects consolidate at least two circuits used by a USB Type-C port into a single integrated circuit (IC). At least one of the at least two circuits is part of a Type-C port controller (TCPC) group of circuits including sensors associated with detecting whether a voltage and current are present at pins of a USB receptacle. At least the other one of the at least two circuits is selected from a battery-related group of circuits including a battery charging circuit, an over-voltage protection (OVP) circuit, and a conditioning circuit. The more circuitry integrated into the single IC the more readily scalable the end product is for a multi-port device. Additional circuitry such as a light emitting diode (LED) driver may also be included in the single IC. One such single IC may be used for each USB Type-C port within a computing device. This scalable architecture allows a battery field effect transistor (FET) to be shared by all battery charging circuitry, which reduces costs and eases layout constraints on a circuit board. Still another option is consolidation of charging arbitration between multiple ones of the single IC to control which charger is active and also control which of the single ICs is the master.

Figure 2:
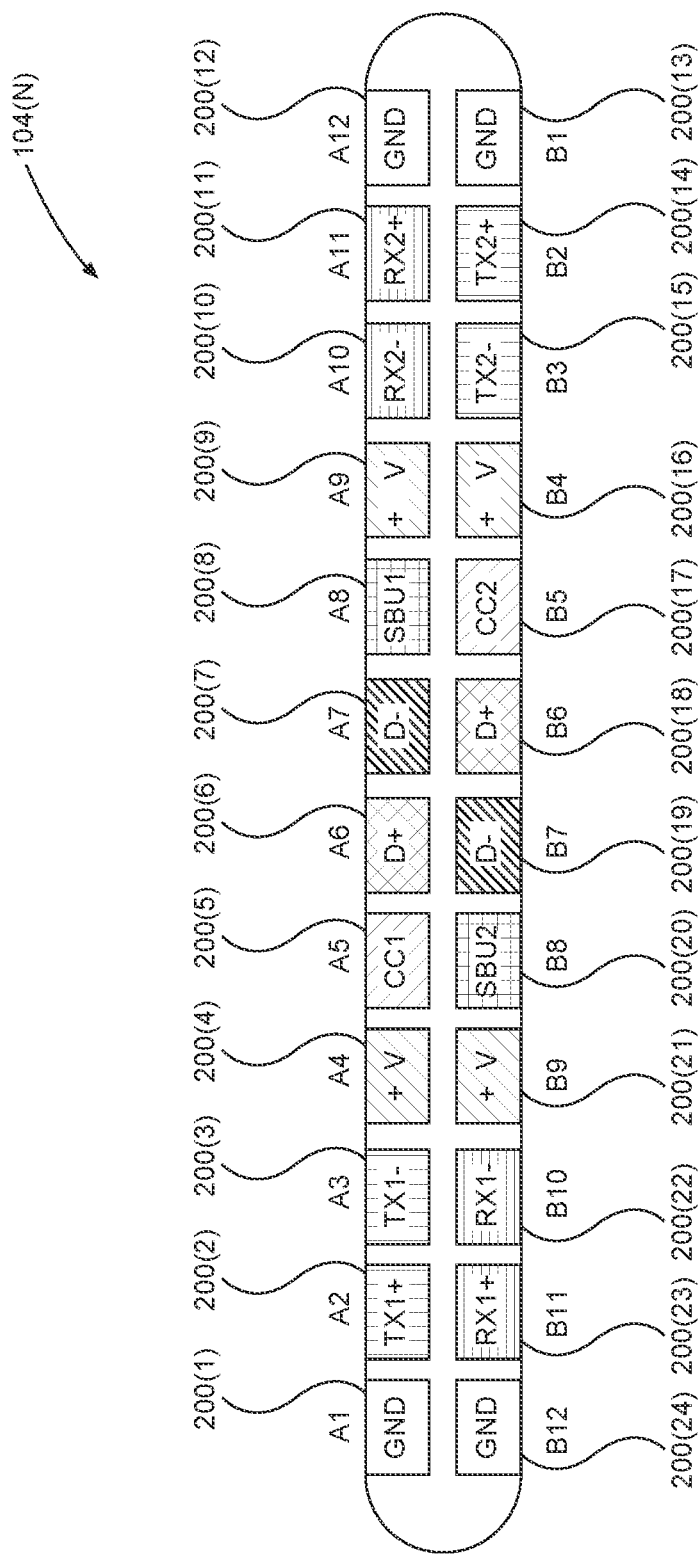
FIG. 2 is a pin layout diagram for a USB Type-C receptacle.
Figure 3:
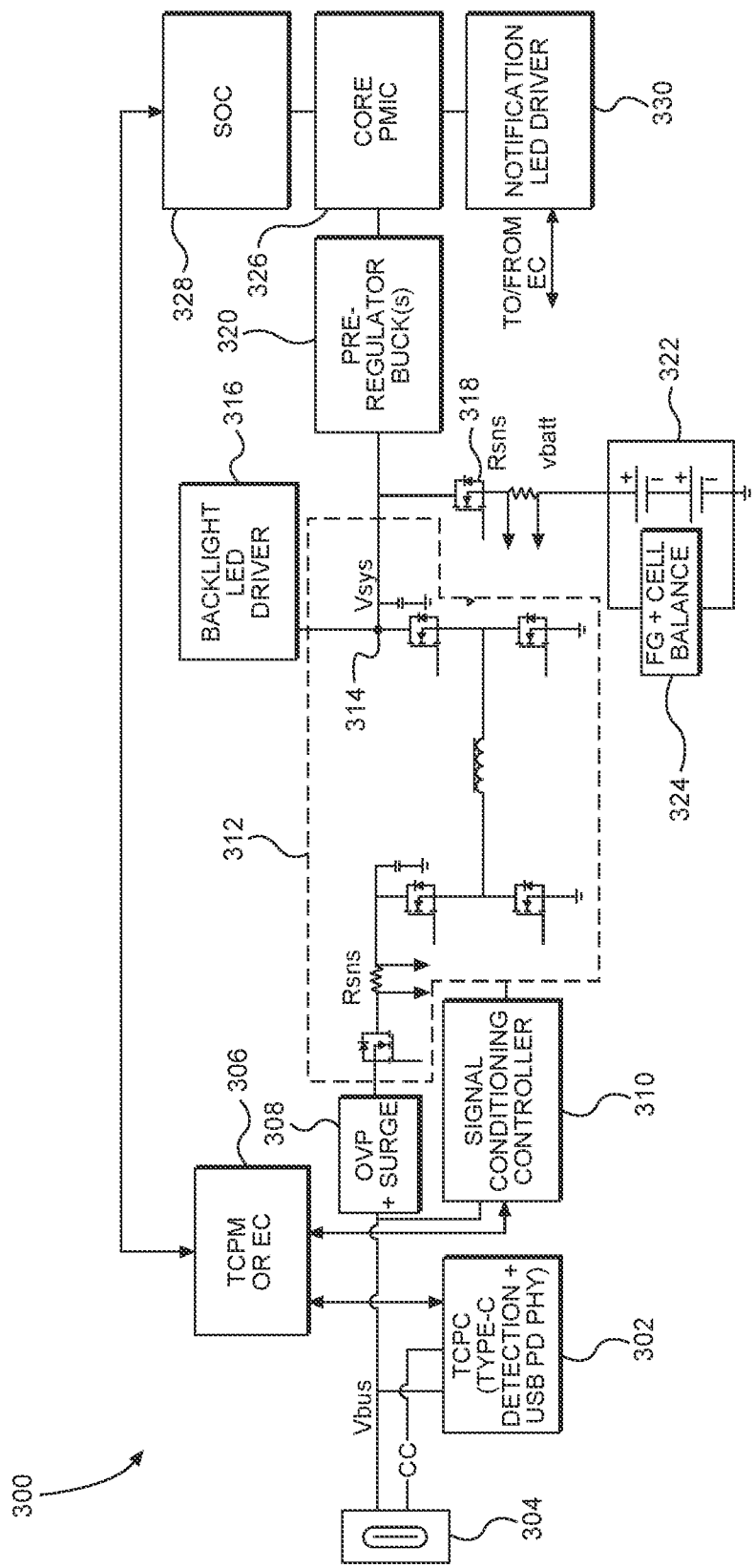
FIG. 3 is a block diagram of a conventional circuit layout for a computing system showing one USB Type-C port.
Figure 4:
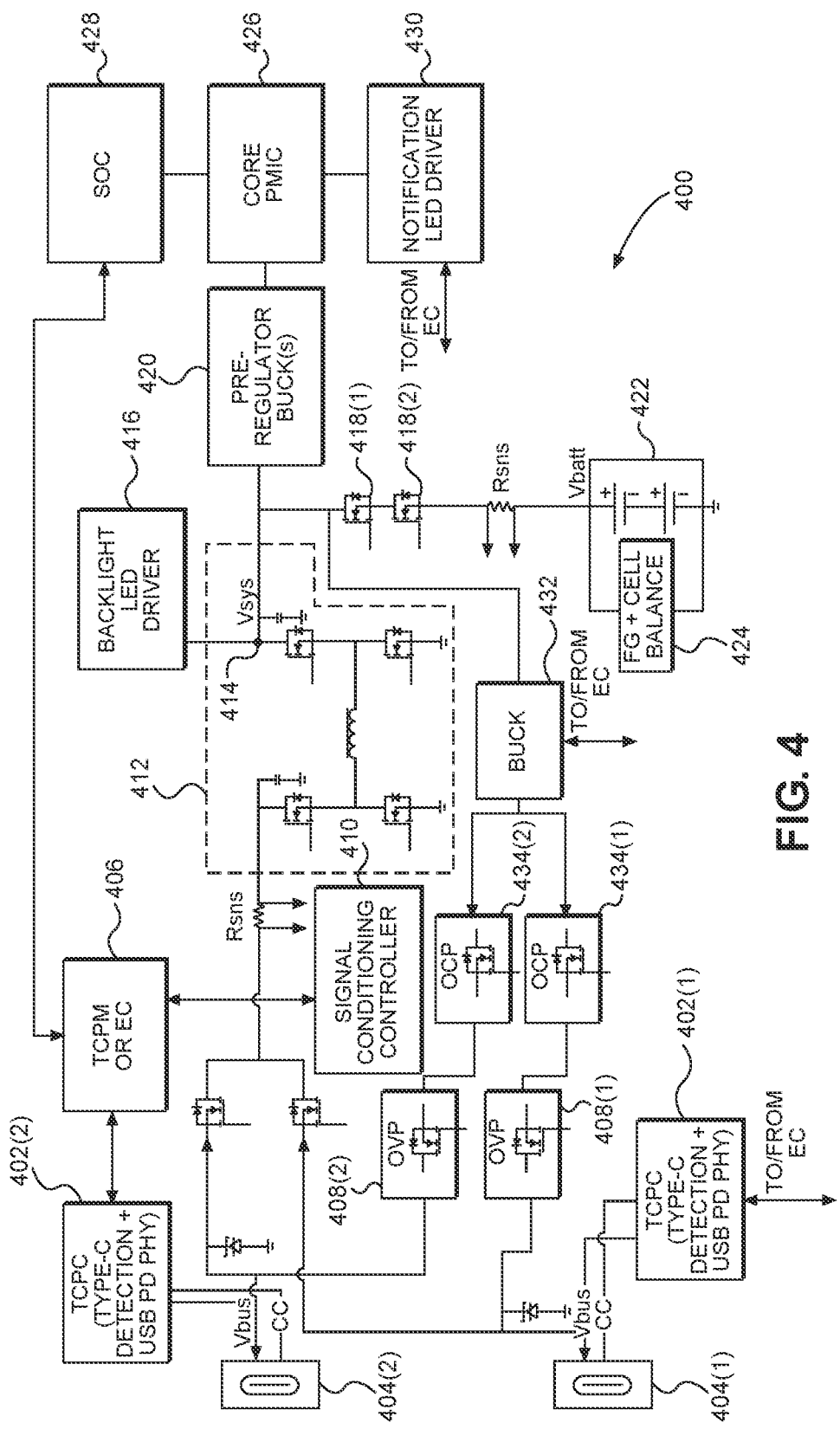
FIG. 4 is a block diagram of a conventional circuit layout for a computing system having multiple USB Type-C ports.

Before addressing specific details of the present disclosure a brief overview of a computing environment that includes multiple USB Type-C ports or receptacles is provided with reference to FIG. 1. FIG. 2 provides a quick introduction to a USB Type-C receptacle to provide context for subsequent discussions. FIGS. 3 and 4 provide simplified block diagrams of conventional solutions to help illustrate some of the advantages realized by exemplary aspects of the present disclosure. A discussion of particulars of the present disclosure begins below with reference to FIG. 5.

In this regard, FIG. 1 is a simplified illustration of a computing environment 100 having a computing device 102, which as illustrated is a laptop computer, but could be another form of computing device (e.g., a phablet, tablet, desktop computer, or the like), or a power bank with multiple Type-C ports. The computing device 102 includes a plurality of USB Type-C receptacles 104(1)-104(N). As illustrated N=4, but can be more or fewer as configured or desired. For the sake of illustration, USB Type-C receptacle 104(1) may be coupled to a plug 106 configured to plug into a wall socket 108 and receive power therefrom. USB Type-C receptacle 104(2) may be coupled to a USB flash drive memory device 110. USB Type-C receptacle 104(3) may be coupled to a mobile phone 112, and USB Type-C receptacle 104(4) may be coupled to a user input device such as a mouse 114. It should be appreciated that other peripherals or power sources may be coupled to the computing device 102 through the plurality of USB Type-C receptacles 104(1)-104(N). Likewise, while the plurality of USB Type-C receptacles 104(1)-104(N) is shown on both sides of the computing device 102, the plurality of USB Type-C receptacles 104(1)-104(N) may all be located on a single side and/or on the back or front sides of the computing device 102 without departing from the scope of the present disclosure.

FIG. 2 illustrates the pin layout for USB Type-C receptacle 104(N). The USB Type-C receptacle 104(N) includes twenty-four pins or contacts 200(1)-200(24), which have functions as assigned by the USB Type-C specification and are summarized in Table 1 below.

TABLE 1

USB TYPE-C CONNECTOR PIN CONFIGURATION

| Number | Pin | Name | Description |
|---|---|---|---|
| 200(1) | A1 | GND | Ground return |
| 200(2) | A2 | SSTXp1 | SuperSpeed differential pair #1, TX, positive |
| 200(3) | A3 | SSTXn1 | SuperSpeed differential pair #1, TX, negative |
| 200(4) | A4 | $V_{BUS}$ | Bus power |
| 200(5) | A5 | CC1 | Configuration Channel |
| 200(6) | A6 | Dp1 | USB 2.0 differential pair, position 1, positive |
| 200(7) | A7 | Dn1 | USB 2.0 differential pair, position 1, negative |
| 200(8) | A8 | SBU1 | Sideband Use (SBU) |
| 200(9) | A9 | VBUS | Bus power |
| 200(10) | A10 | SSRXn2 | SuperSpeed differential pair #2, RX, negative |
| 200(11) | A11 | SSXp2 | SuperSpeed differential pair #2, RX, positive |
| 200(12) | A12 | GND | Ground return |
| 200(13) | B1 | GND | Ground return |
| 200(14) | B2 | SSTXp2 | SuperSpeed differential pair #2, TX, positive |
| 200(15) | B3 | SSTXn2 | SuperSpeed differential pair #2, TX, negative |
| 200(16) | B4 | $V_{BUS}$ | Bus power |
| 200(17) | B5 | CC2 | Configuration Channel |
| 200(18) | B6 | Dp2 | USB 2.0 differential pair, position 2, positive |
| 200(19) | B7 | Dn2 | USB 2.0 differential pair, position 2, negative |
| 200(20) | B8 | SBU2 | Sideband use |
| 200(21) | B9 | $V_{BUS}$ | Bus power |
| 200(22) | B10 | SSRXn1 | SuperSpeed differential pair #1 RX, negative |
| 200(23) | B11 | SSRXp1 | SuperSpeed differential pair #1, RX, positive |
| 200(24) | B12 | GND | Ground return |

It should be appreciated that a USB connector, such as a plug inserted into any of the plurality of USB Type-C receptacles 104(1)-104(N), has complementary conductive elements. In some exemplary aspects, such conductive elements are pins, and in others, such conductive elements are contact pads. As used herein, the conductive elements of the plurality of USB Type-C receptacles 104(1)-104(N) are referred to as pins regardless of the specific form they take. The form factor of the USB Type-C receptacle is defined in the USB Type-C specification and well understood at this point.

Each of the plurality of USB Type-C receptacles 104(1)-104(N) is, in essence, a USB port which may, according to the USB Type-C specification, provide power (i.e., act as a power source) or consume power (i.e., act as a power sink) and may further exchange data as is well understood. To effectuate such functionality, each port may be configured with control circuitry that performs Vbus and command and control (CC) detection (to ascertain insertion, orientation of insertion, and a resistor value associated with the inserted connector, which provides a variety of information to the computing device), a power delivery (PD) physical layer (PHY) (PD PHY), and a D+/D− detection circuit. Further, battery-related circuits are required, including an over-voltage protection circuit, a conditioning circuit such as a buck, boost, or buck-boost converter circuit, and a battery charger circuit. While over-voltage protection may be applicable in contexts outside of battery charging, for the purposes of the present disclosure, the present disclosure defines the over-voltage protection circuit as a battery-related circuit.

Conventional implementations implement these circuits as distinct ICs, which consume valuable real estate within the computing device, complicate wire routing, add general system complexity, and may have electromagnetic interference ramifications. FIGS. 3 and 4 illustrate exemplary conventional systems. The burden on designing a viable layout is not insignificant with a single USB Type-C receptacle as illustrated in FIG. 3, but even worse with even just two USB Type-C receptacles as illustrated in FIG. 4.

In this regard, FIG. 3 illustrates a conventional computing system 300 that has a TCPC 302 associated with a Type-C receptacle 304. The TCPC 302 may perform Type-C detection and have the USB PD PHY in a single IC. The TCPC 302 receives signals from Vbus pins 200(4) and 200(16) as well as from CC pins 200(5) and 200(17). The TCPC 302 may interoperate with a Type-C port manager (TCPM) 306 (sometimes referred to as an embedded controller (EC)). The signals from the Vbus pins 200(4) and 200(16) are also provided to an over-voltage protection circuit 308 and a signal conditioning controller 310. The signal conditioning controller 310 controls a signal conditioning circuit 312. The signal conditioning circuit 312 is, in an exemplary aspect, a buck-boost charger, which provides a signal at an output node 314. The over-voltage protection circuit 308 may also contain a surge protection circuit and is thus labeled OVP+ Surge in the figures.

With continued reference to FIG. 3, the output node 314 is coupled to a backlight LED driver 316, which may be used to drive LEDs for screen backlight control, a battery FET 318, and an output pre-regulator buck circuit 320. The battery FET 318 provides power to a battery pack circuit 322, which may include a fuel gauge (sometimes shown as FG in the figures) and cell balance circuit 324. The output pre-regulator buck circuit 320 provides power to a core power management IC (PMIC) 326, which in turn provides power to a main processing circuit 328 (referred to as a system on a chip (SOC) in FIG. 3) of the computing system 300. The main processing circuit 328 communicates with the TCPM 306. In some devices, the PMIC 326 also provides a signal to a notification LED driver 330, which may be up to four channels. As illustrated, four channels is sufficient to indicate whether a charger is present, that a battery is charging, a dead battery, and a hibernation mode. In certain applications the LED channels may also be used for other indications, such as battery state of charge, etc.

As is readily apparent, the conventional computing system 300 includes many separate ICs with commensurate interstitial elements (e.g., resistors, transistors, inductors, capacitors, and the like), wire routing, and placement challenges. These challenges are exacerbated when there is more than one USB Type-C receptacle. In this regard, FIG. 4 shows a conventional computing system 400 having two TCPCs 402(1)-402(2) and two USB Type-C receptacles 404(1)-404(2). The TCPCs 402(1)-402(2) may be separate ICs, with each one able to perform Type-C detection and having the USB PD PHY in a single IC. The TCPCs 402(1)-402(2) receive signals from the respective Vbus pins 200(4) and 200(16) as well as from the CC pins 200(5) and 200(17). The TCPCs 402(1)-402(2) may interoperate with a TCPM 406. The signals from the Vbus pins 200(4) and 200(16) are also provided to over-voltage protection circuits 408(1)-408(2) and a signal conditioning controller 410. The signal conditioning controller 410 controls a signal conditioning circuit 412. The signal conditioning circuit 412 is, in an exemplary aspect, a buck-boost charger, which provides a signal at an output node 414.

With continued reference to FIG. 4, the output node 414 is coupled to a backlight LED driver 416, a pair of battery FETs 418(1)-418(2), and an output pre-regulator buck circuit 420. Battery FET 418(2) provides power to a battery pack circuit 422, which may include a fuel gauge and cell balance circuit 424. The output pre-regulator buck circuit 420 provides power to a core PMIC 426, which in turn provides power to a main processing circuit 428 (SOC) of the computing system 400. The main processing circuit 428 communicates with the TCPM 406. In some devices, the PMIC 426 also provides a signal to a four-channel notification LED driver 430. The output node 414 may also be connected to a buck converter 432, which is coupled to two over-current protection (OCP) circuits 434(1)-434(2). When the battery pack circuit 422 has an internal ship mode, a single battery FET 418 may be sufficient. As used herein, a ship mode is a mode into which a device is placed when the device is likely to be in a warehouse or on a shelf for a long period of time and there is a desire to not discharge the battery completely. Thus, in the ship mode, the battery is disconnected from the system so that battery drain is minimal. In such instance, the only way to exit the ship mode is through the insertion of power into the device. When the battery pack circuit 422 does not have the internal ship mode, then two battery FETS are used to implement the ship mode so that battery drain is minimal. In this case, it may be possible, depending on the device to exit the ship mode through keypad entry. It is also true that back-to-back FETS 418(1)-418(2) may also help with additional protection during discharging (e.g., a short circuit or the like).

Again, it is readily apparent that the placement, routing, and general system complexity becomes increasingly complex as the number of Type-C receptacles increases. Exemplary aspects of the present disclosure consolidate at least some of the TCPC circuits and some of the battery-related circuits into a single IC. The more circuits consolidated, the greater the impact on the placement and routing concerns and the more readily scalable the solution provided. Additionally, battery FETs analogous to the battery FETs 318 and 418(1)-418(2) may be shared, eliminating configurations with plural battery FETs. In still another aspect, one or more LED drivers may be consolidated into the single IC.

Figure 5:
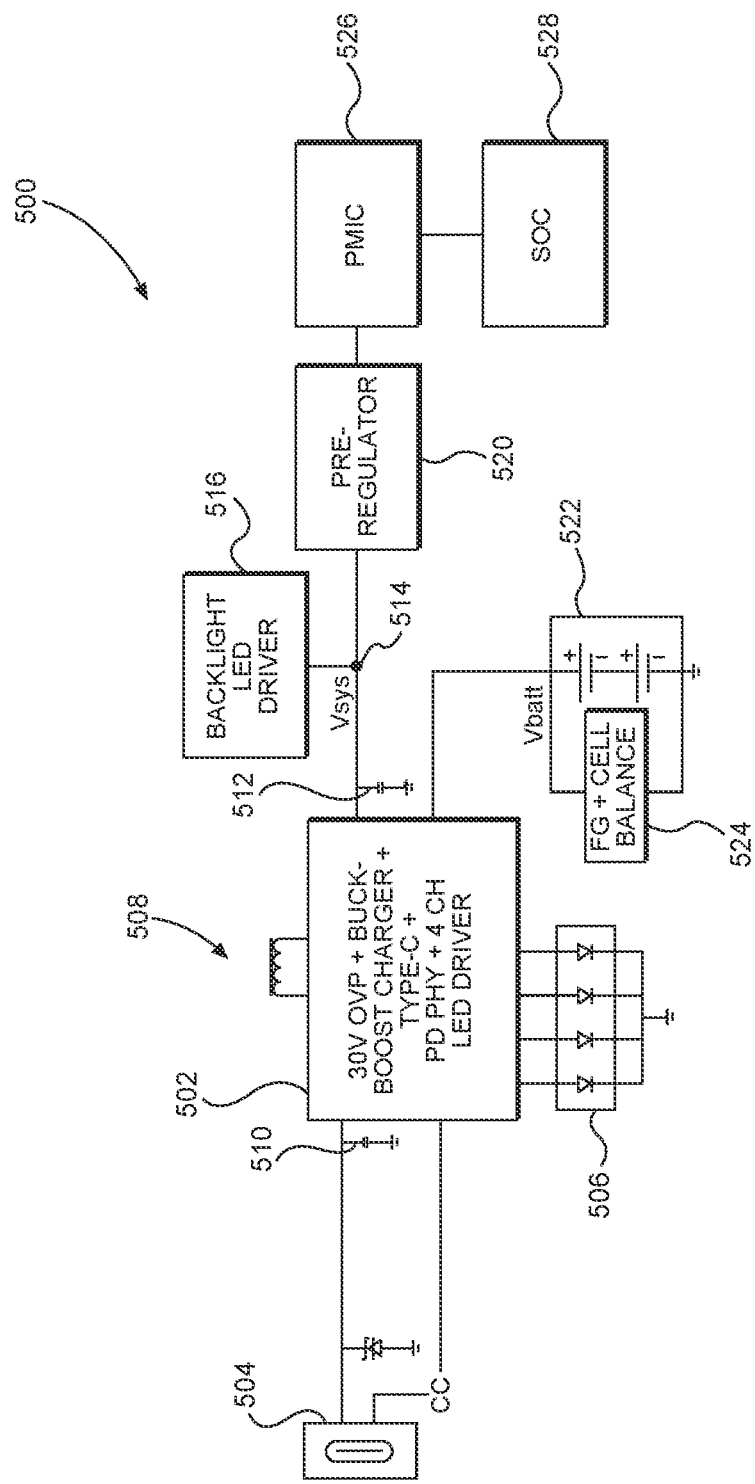
FIG. 5 is a block diagram of a consolidated integrated circuit (IC) architecture for a computing system showing one USB Type-C port according to exemplary aspects of the present disclosure.

In this regard, FIG. 5 illustrates a computing system 500 having a consolidated IC 502 coupled to a USB Type-C receptacle 504. The consolidated IC 502 includes an over-voltage protection circuit (e.g., OVP in FIG. 5), a signal conditioning circuit, such as a buck-boost converter, Type-C detection circuitry, which may be a Vbus and/or CC signal detection circuit and/or a D+/D− detection circuit, and a USB PD PHY circuit. While not illustrated, the consolidated IC 502 may optionally include an internal battery FET analogous to the battery FET 318 of FIG. 3. A further element not shown in FIG. 5 may be an output current limit sense resistor. This output current limit sense resistor may be integrated into the consolidated IC 502 or may remain external to the consolidated IC 502 without departing from the scope of the present disclosure. As suggested by its name, the output current sense resistor may be used to measure current and impose limits thereon. Additionally, the consolidated IC 502 may include an LED driver circuit (e.g., four channels illustrated), which drives an LED array 506. Again more or fewer than four channels may be ascribed to the LED driver circuit. An inductor 508 and/or capacitors 510 and 512 of the buck-boost converter may also be positioned off chip. The consolidated IC 502 couples to an output node 514, which is coupled to a backlight LED driver 516, a pre-regulator conditioning circuit 520, and a battery pack circuit 522, which may include a fuel gauge and cell balance circuit 524. Instead of positioning a battery FET analogous to the battery FET 318 in the consolidated IC 502, such battery FET may be positioned outside the consolidated IC 502. For example, such battery FET may be serially positioned before the battery pack circuit 522. In the event that the battery FET is inside the consolidated IC 502, the output current limit sense resistor mentioned above is redundant. Even if the output current limit sense resistor is redundant, the resistor may still be integrated into the consolidated IC 502. The pre-regulator conditioning circuit 520 couples to a PMIC 526, which in turn couples to a SOC 528. In an exemplary aspect, the pre-regulator conditioning circuit 520 is a DC/DC switching (buck or buck/boost) or a charge-pump based regulator (DIV/2 or DIV/3 or DIV/n) to convert a system voltage to other voltage rails required by the various system components. It should be appreciated that in some instances there is no PMIC 526 and the pre-regulator conditioning circuit 520 may more accurately be "regulator." While this situation is not illustrated, it is also within the scope of the present disclosure.

Figure 6:
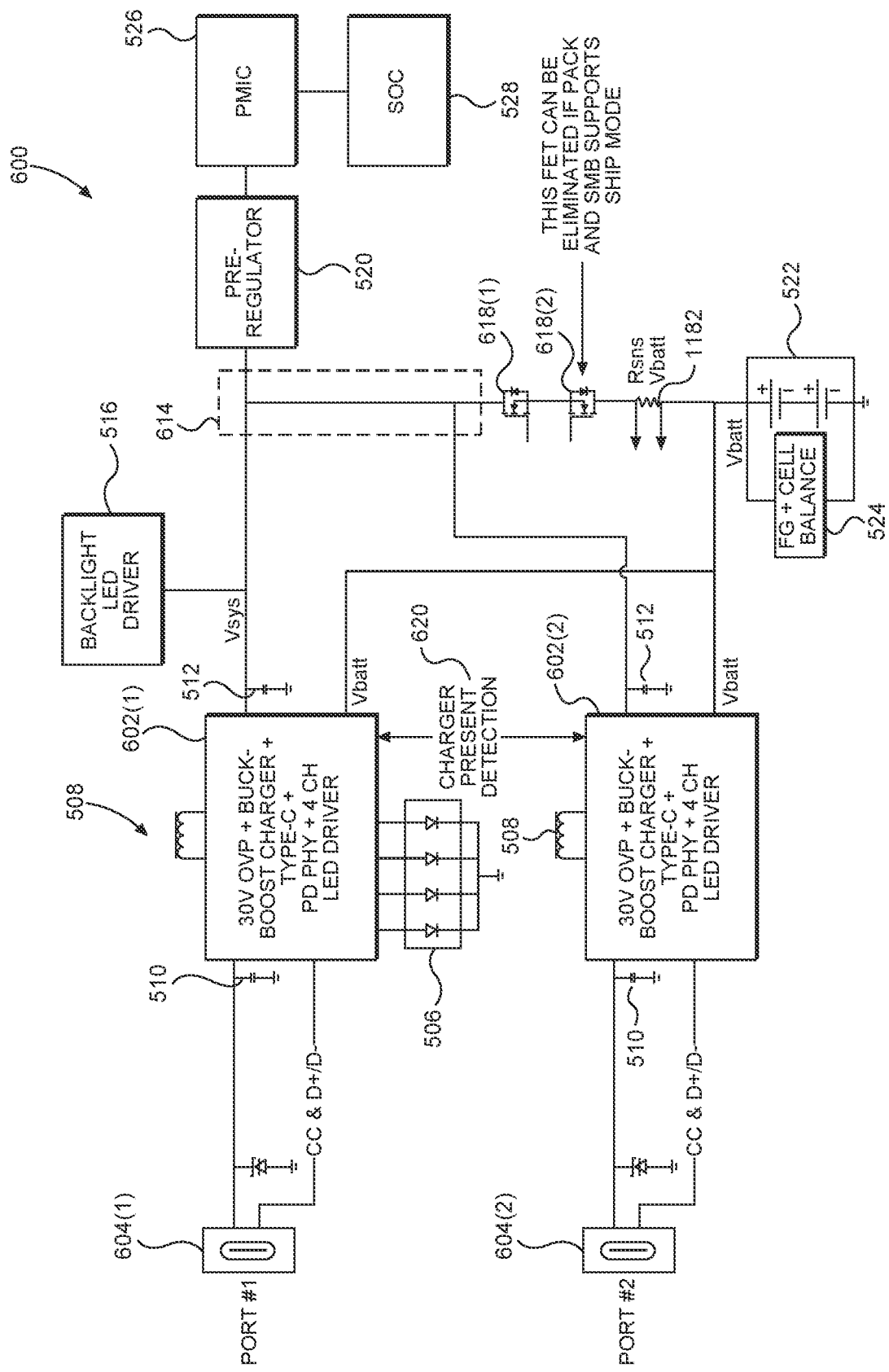
FIG. 6 is a block diagram of a computing system having multiple USB Type-C ports each with a consolidated IC according to exemplary aspects of the present disclosure with a charger present link between consolidated ICs.

Similarly, FIG. 6 illustrates a computing system 600 with two consolidated ICs 602(1)-602(2) for respective USB Type-C receptacles 604(1)-604(2). The consolidated ICs 602(1)-602(2) both couple to an output node 614. Other circuits are substantially similar to those described above with reference to FIG. 5. As illustrated by FETs 618(1)-618(2), the consolidated ICs 602(1)-602(2) may share a battery FET. Note also that one or more of the FETs 618(1)-618(2) may instead be placed inside one or both of the consolidated ICs 602(1)-602(2). While two battery FETs 618(1)-618(2) are illustrated, one battery FET may be eliminated if the battery pack circuit 522 supports a ship mode. Again, it is possible that the PMIC 526 is not present and the pre-regulator conditioning circuit 520 is more accurately described as a regulator.

The consolidated ICs 602(1)-602(2) may communicate through a charger present detection line 620. This line 620 allows the consolidated ICs 602(1)-602(2) to indicate to one another whether one of the consolidated ICs 602(1)-602(2) is acting as a power sink and thus preclude others from acting as a power sink. Avoiding duplication of power sink states avoids overcharging the battery. More information on this arbitration is provided below with reference to FIG. 13.

Also note that while only two consolidated ICs 602(1)-602(2) are illustrated, exemplary aspects of the present disclosure readily scale to computing devices that have more than two USB ports by adding additional consolidated ICs 602.

Figure 7:
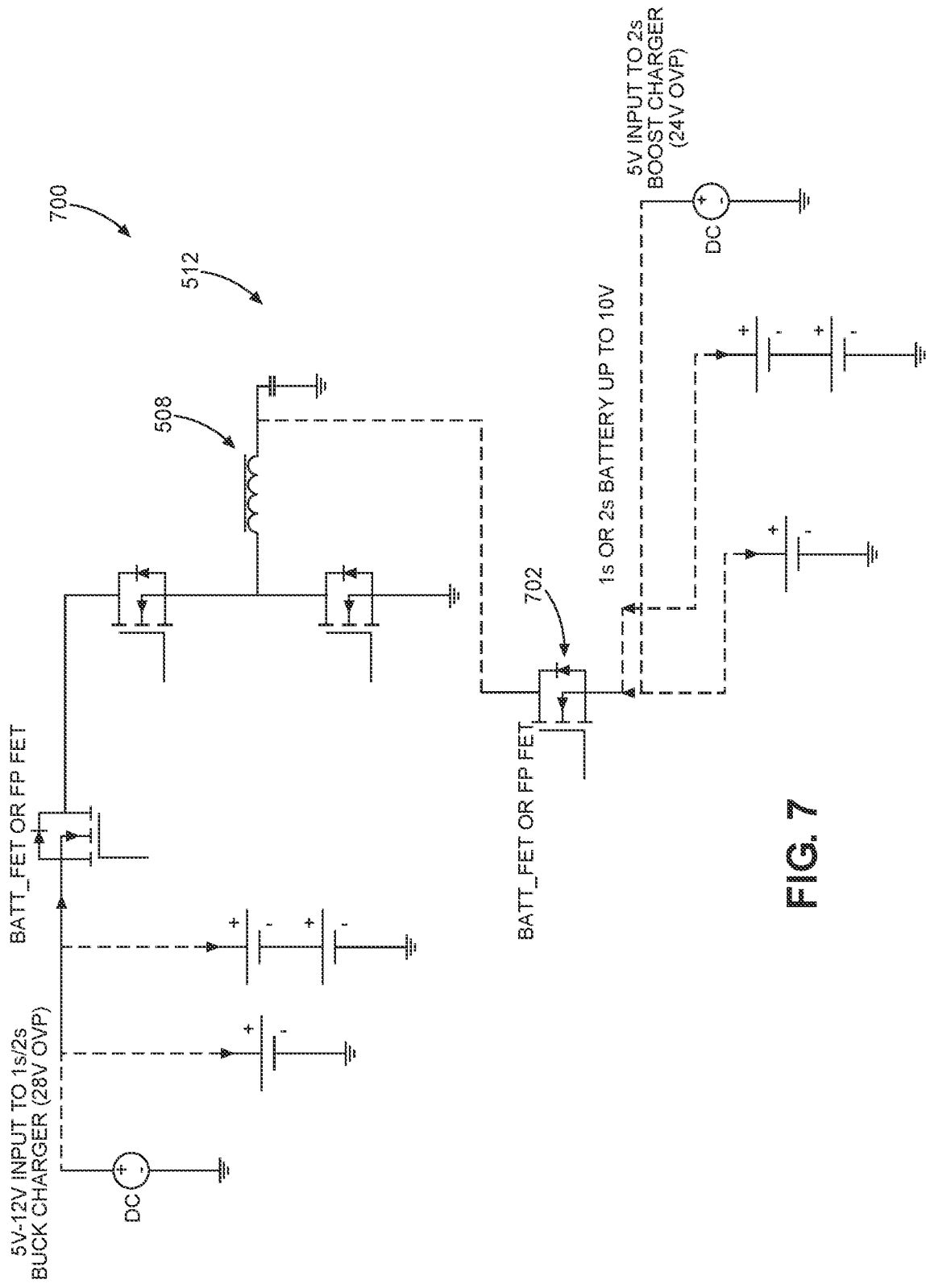
FIG. 7 is a circuit diagram of a configurable buck converter circuit that may be used within the consolidated ICs of FIGS. 5 and 6.

FIG. 7 illustrates an exemplary buck converter circuit 700 that may be used as the signal conditioning circuit inside the consolidated ICs 502 or 602(1)-602(2). Note that the battery may be one cell (sometimes referred to as 1S), two cells in series (sometimes referred to as 2S), or three or more cells in series (3S, 4S, etc.). As the number of cells in series increases, the input voltage may be increased. For example, 5 volts (V) may input to a 2S, 3S, or 4S charger. Likewise, the battery FET (internal or external) and all other FETs may be resized to accommodate these higher input voltages. E.g., 10 V, 20 V to 1S, 2S, 3S, or 4S battery up to 20 V FETs can be even higher rating to address 3S and 4S. Note that these values are intended to be exemplary and not limiting. As illustrated, battery FET 702 is a single FET, but it should be appreciated that more than one battery FET may be used. Further, it should be appreciated that the battery FET 702 may be internal to the consolidated IC 502 or external.

Figure 8:
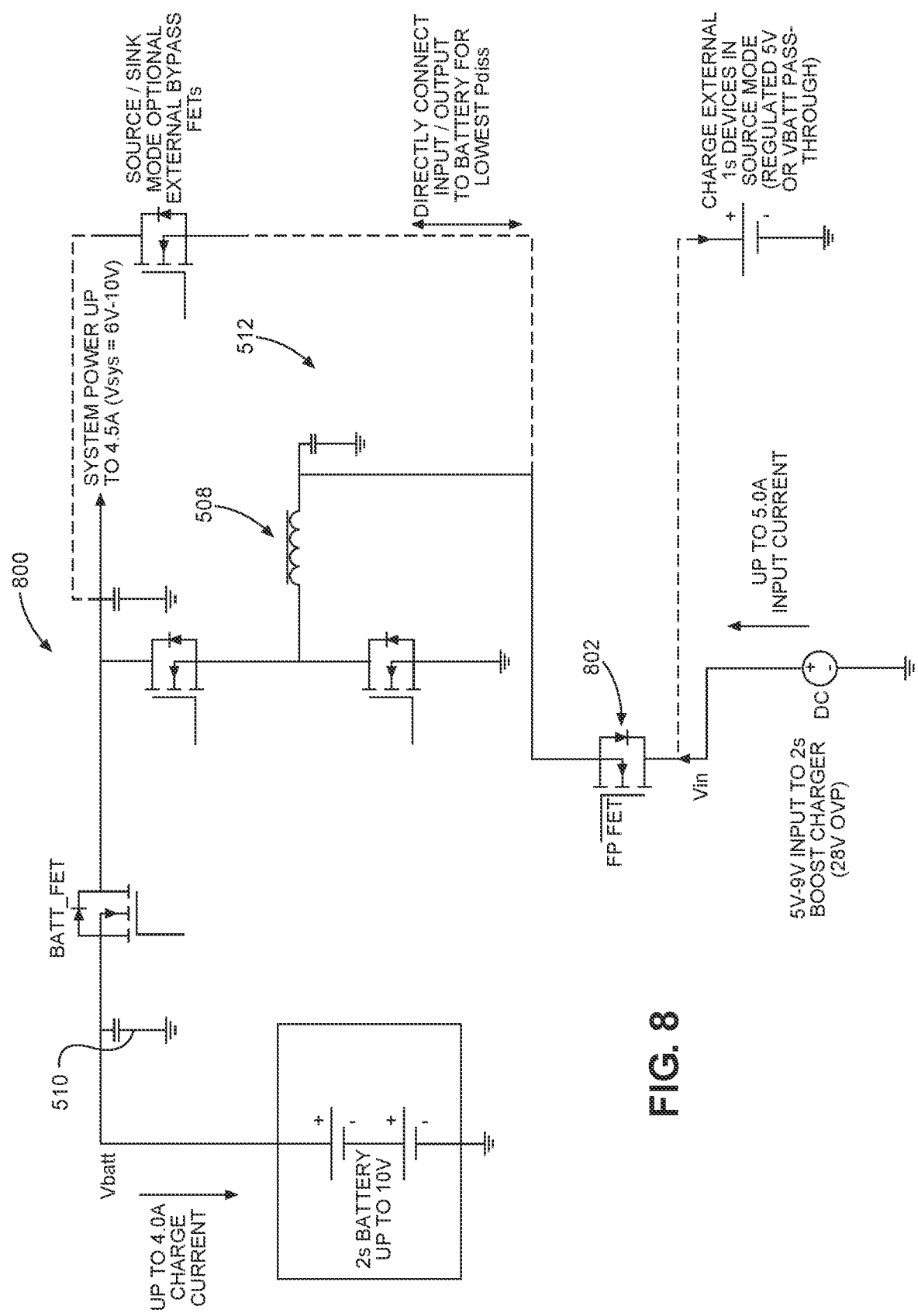
FIG. 8 is a circuit diagram of a boost converter circuit that may be used within the consolidated ICs of FIGS. 5 and 6.

FIG. 8 illustrates an exemplary boost converter circuit 800 that may be used as the signal conditioning circuit inside the consolidated ICs 502 or 602(1)-602(2). Again, while only a single battery FET 802 is illustrated, there may be plural battery FETs. Likewise, the battery FET 802 may be external or integrated into the consolidated IC 502.

Figure 9:
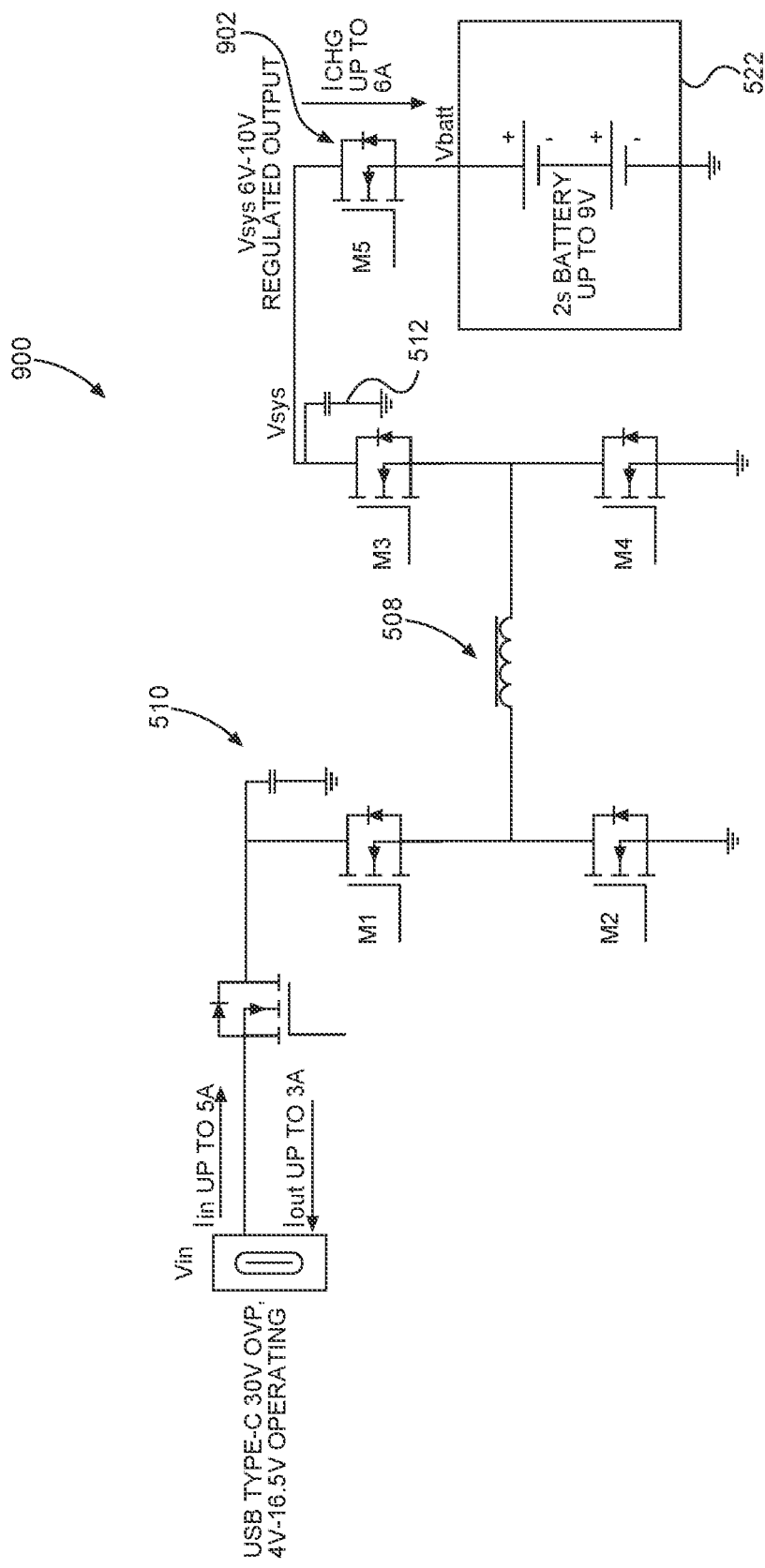
FIG. 9 is a circuit diagram of a non-inverting buck-boost converter circuit that may be used within the consolidated ICs of FIGS. 5 and 6.

FIG. 9 illustrates an exemplary non-inverting buck-boost converter circuit 900 that may be used as the signal conditioning circuit inside the consolidated ICs 502 or 602(1)-602(2). Again, while only a single battery FET 902 is illustrated, there may be plural battery FETs. Likewise, the battery FET 902 may be external or integrated into the consolidated IC 502.

Again, while the circuits 800 and 900 are illustrated with two cell series batteries (2s), it should be appreciated that the circuits can be expanded to 3S and 4S and also a VIN of >16.5V not shown here. Again, this value is exemplary and not intended to be limiting.

Figure 10:
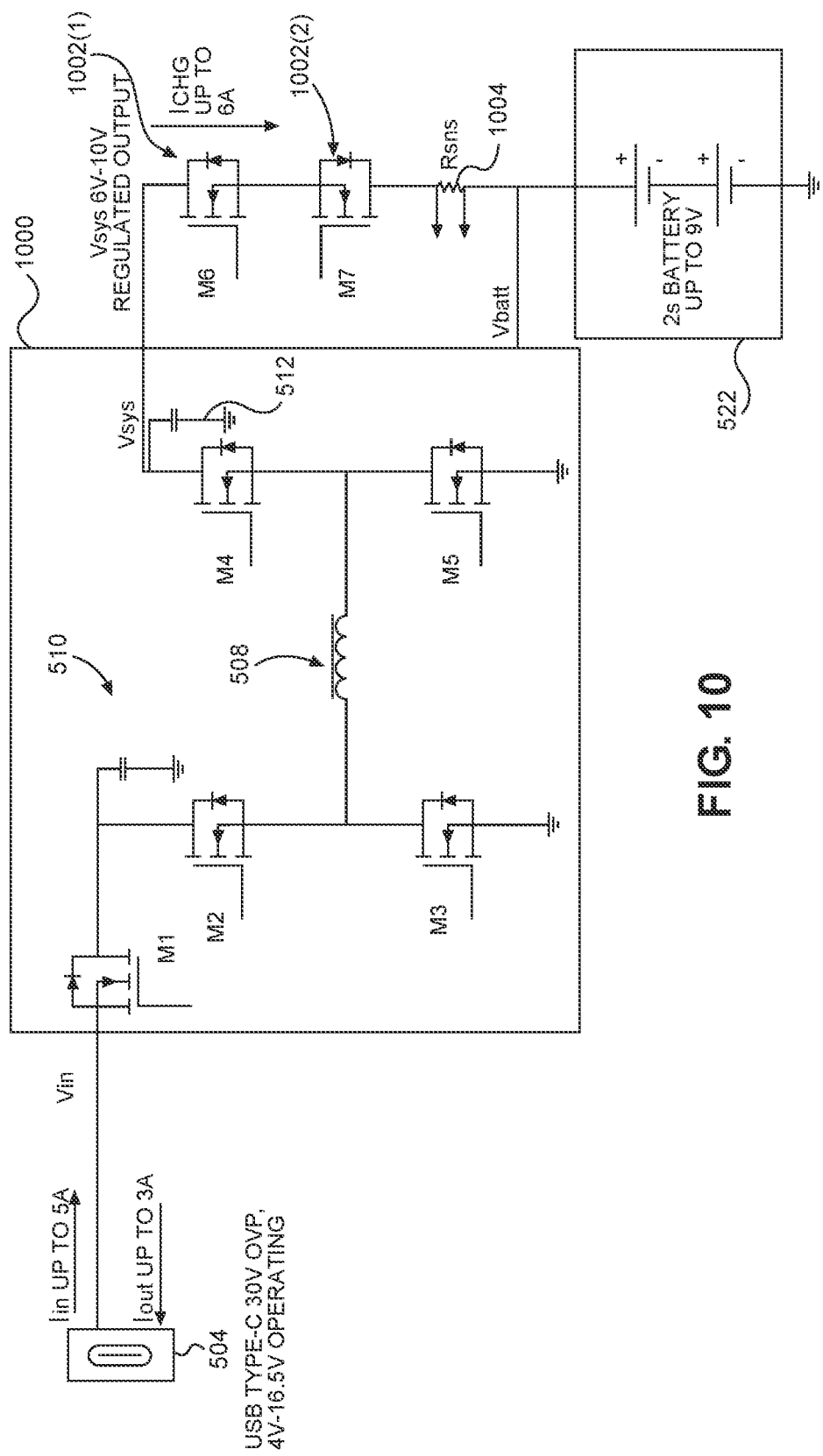
FIG. 10 is a circuit diagram of a non-inverting buck-boost converter circuit having series battery field effect transistors (FETs) at a regulated output that may be used within the consolidated ICs of FIGS. 5 and 6.

FIG. 10 illustrates an alternate exemplary non-inverting buck-boost converter circuit 1000 that may be used as the signal conditioning circuit inside the consolidated ICs 502 or 602(1)-602(2). Again, while two battery FETs 1002(1)-1002(2) are illustrated, there may be only one battery FET. Likewise, the battery FET(s) 1002(1)-1002(2) may be external or integrated into the consolidated IC 502. Likewise, a sense resistor 1004 (also labeled Rsns) may be integrated into the consolidated IC 502 or 602(1)-602(2).

Note that the signal conditioning circuits illustrated in FIGS. 7-10 are exemplary and other buck, boost, or buck-boost circuits may be used without departing from the scope of the present disclosure.

The following table is an exemplary pin layout for the consolidated ICs 502 or 602(1)-602(2). The precise layout may change depending on design without departing from the scope of the present disclosure. Likewise, pins may be added without departing from the scope of the present disclosure. Still further, not every pin in this table is required to provide the functionality of the present disclosure. That said, this table represents a currently contemplated best listing of pins.

| External pin name | | Pin type | Pin description |
|---|---|---|---|
| BATT_FET_CTRL | 1142 | Output | Open-drain active-low output for controlling PMOS type batt FETs. Connect to gate of battery FET(s) and pull-up with resistor to Vbatt |
| BATT_ID | 1130 | Input | Battery ID input pin |
| BATT_THERM | 1132 | Input | Battery thermistor (NTC) input pin |
| BOOT_CAP1 | 1154 | Input/Output | Boot capacitor #1 connection |
| BOOT_CAP2 | 1146 | Input/Output | Boot capacitor #2 connection |
| CC_OUT | 1112 | Output | push-pull tri-state output indicating CC1 or CC2 connection (orientation) |
| CC1/ID | 1108 | Input | OTG mode enable or CC1 pin for USB Type-C connector (user programmable) |
| CC2 | 1110 | Input | CC2 pin for USB Type-C connector |
| CHG_OUT | 1140 | Power | Battery trickle and pre-charger output |
| CONN_THERM | 1122 | Input | USB connector temperature monitor thermistor (NTC) input pin |
| DN/USB_DN | 1104 | Input/Output | BC1.2 Power source detection-Connect to USB D− signal line |
| DP/USB_DP | 1106 | Input/Output | BC1.2 Power source detection-Connect to USB D+ signal line |
| I_BATT_SNS_N | 1136 | Input | Input battery current sense from low-side of sense resistor |
| I_BATT_SNS_P | 1138 | Input | Input battery current sense from high-side of sense resistor |
| KPDPWR_N | 1116 | Input | System power-on trigger |
| ADDR | | Input | Input indicating I2C/SMBus address |
| P_GND | 1150 | Power | Charger power ground |
| PB_EN/SYSOK | 1118 | Output | Active-high push-pull output which connects to the pre-buck regulator. |
| PORT_CTRL | 1120 | Input/Output | Open-drain I/O which is active-high to indicate when a power source (charger) is connected to the IC. |
| REF_GND | 1126 | GND | Reference ground of PMI bandgap |
| SCL/SPMI_CLK | | Input | Open-drain I2C or SMBus clock input. |
| SDA/SPMI_DATA | | Input/Output | Open-drain I2C or SMBus data input. |
| SHDN_N | | Input | Shut down control |
| SHIP_CTRL | | Output | Ship mode control. |
| SKIN_THERM | 1124 | Input | Skin (surface) temperature monitor thermistor (NTC) input pin |
| STAT | | Output | Open-drain IRQ indicator |
| USBIN | 1106 | Power | USBIN power input of the charger |
| USBIN_MID | | Power | Input current sense bypass for USBIN and switcher input |
| V_BATT_SNS_N | 1128 | Input | Negative differential battery voltage sense input |
| V_BATT_SNS_P | 1134 | Input | Positive differential battery voltage sense input |
| VCONN_IN | 1114 | Input | Input to connect external Vconn power source |
| VDDCAP | 1156 | Output | Auxiliary LDO output |
| VSW_BOOST | 1148 | Power | Boost switch node |
| VSW_BUCK | 1152 | Power | Buck switch node |
| VSYS | 1144 | Power | System power output node |

-continued

| External pin name | | Pin type | Pin description |
| --- | --- | --- | --- |
| MID_CHG | 1160 | Power | Input current sense bypass node |
| LED output | 1158 | Output | Drive the LED |

Figure 11:
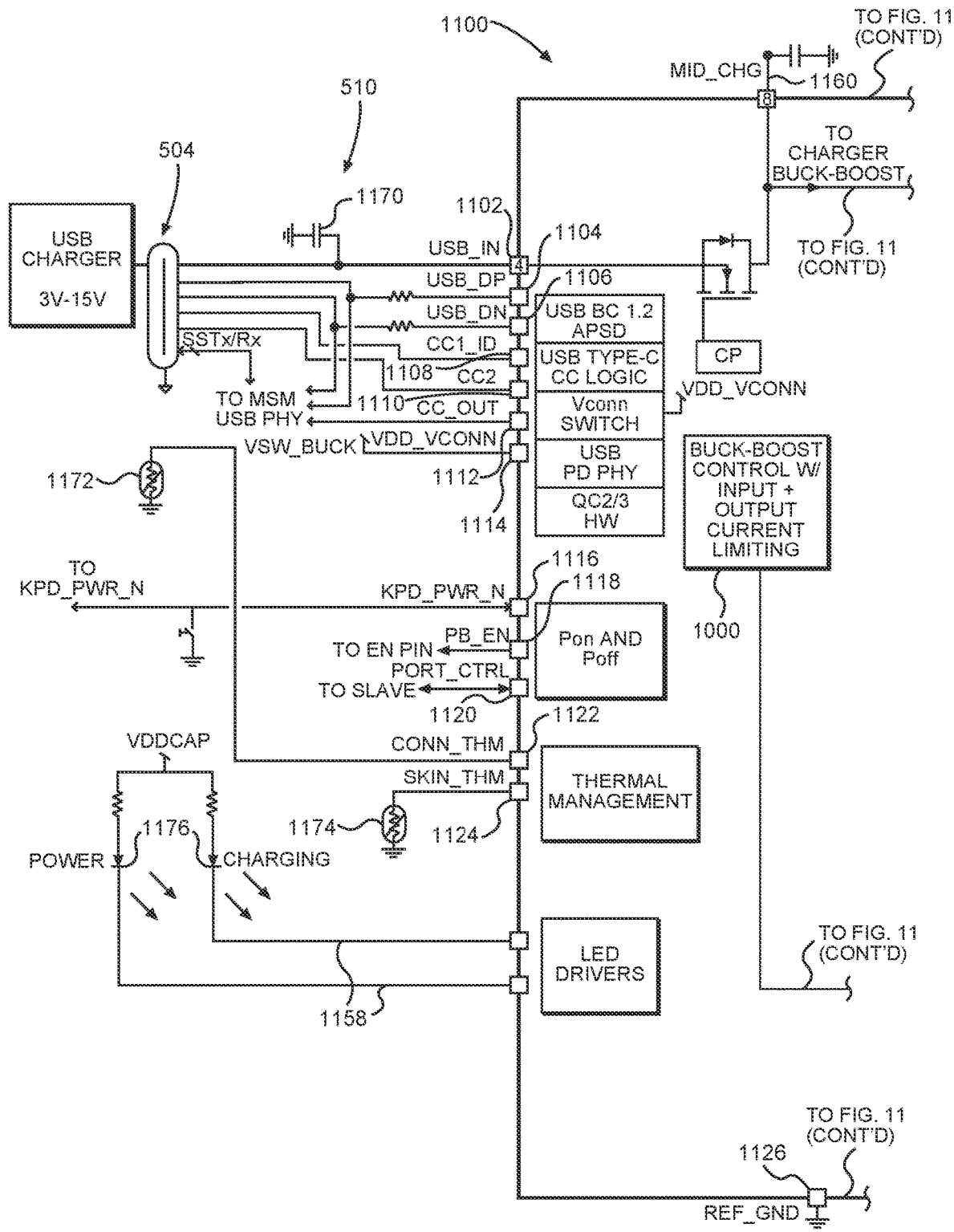
FIG. 11 is a simplified circuit diagram of a consolidated IC in situ with a more complete pin layout and associated circuitry according to exemplary aspects of the present disclosure.
Figure 11:
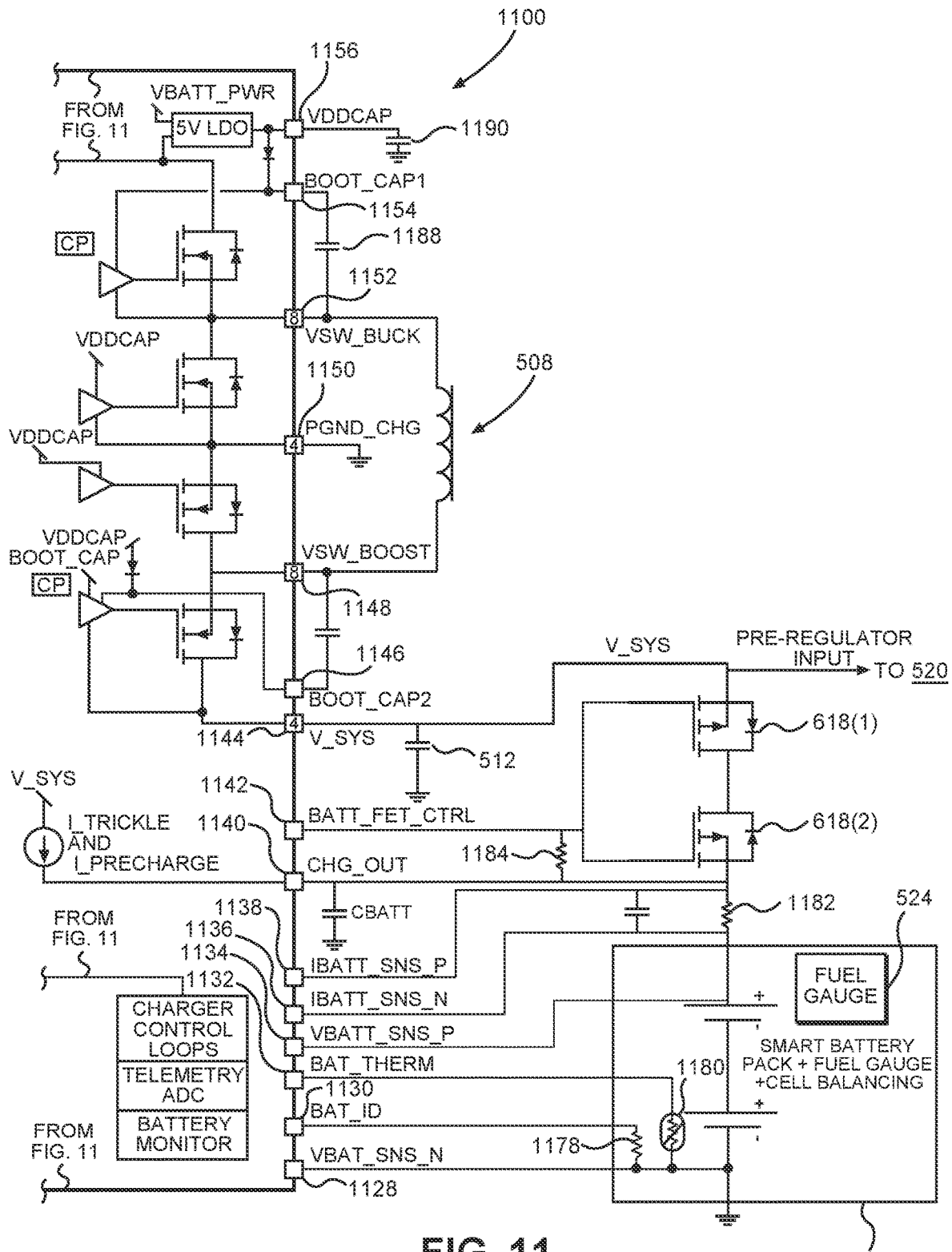
Figure 12:
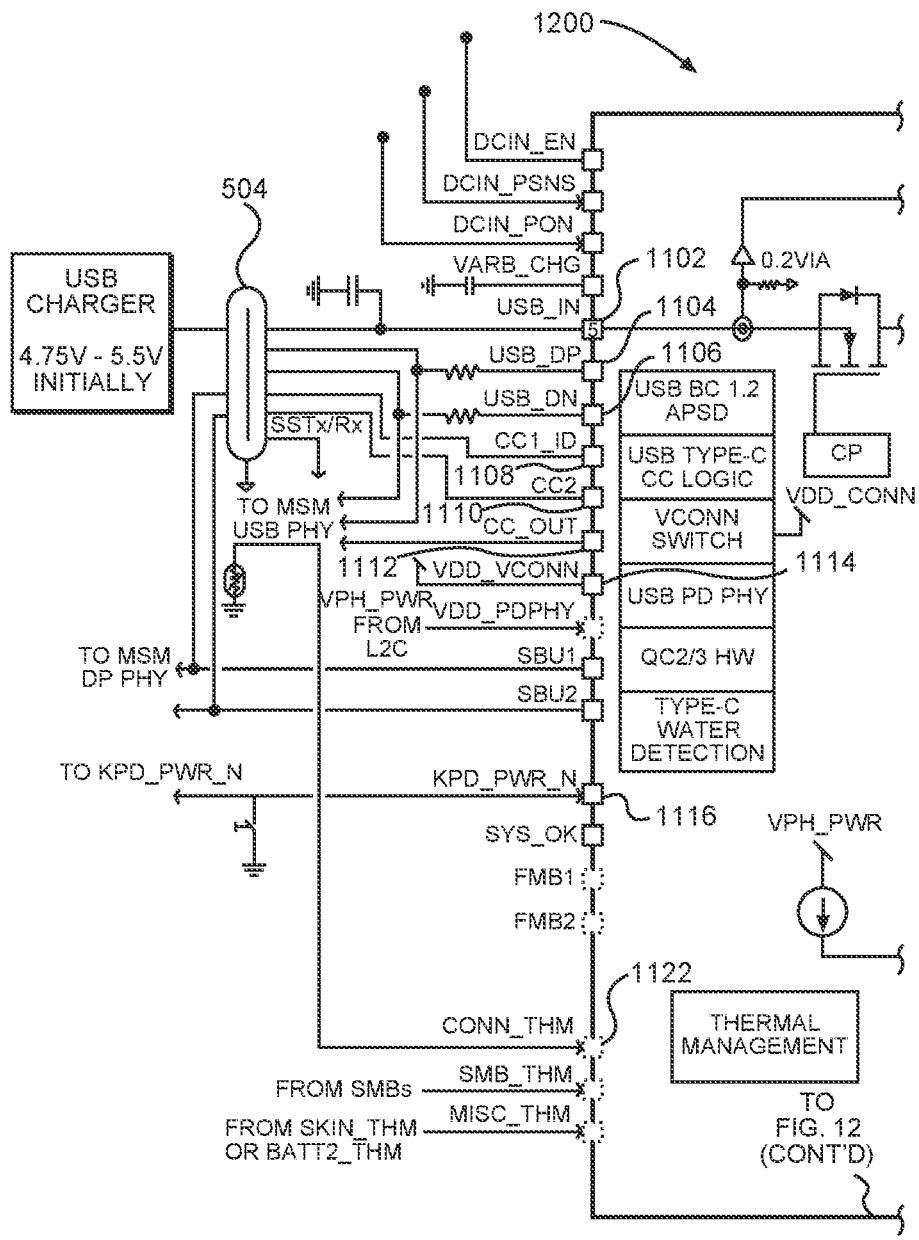
FIG. 12 is a simplified circuit diagram of an alternate consolidated IC in situ with a more complete pin layout and associated circuitry according to exemplary aspects of the present disclosure.
Figure 12:
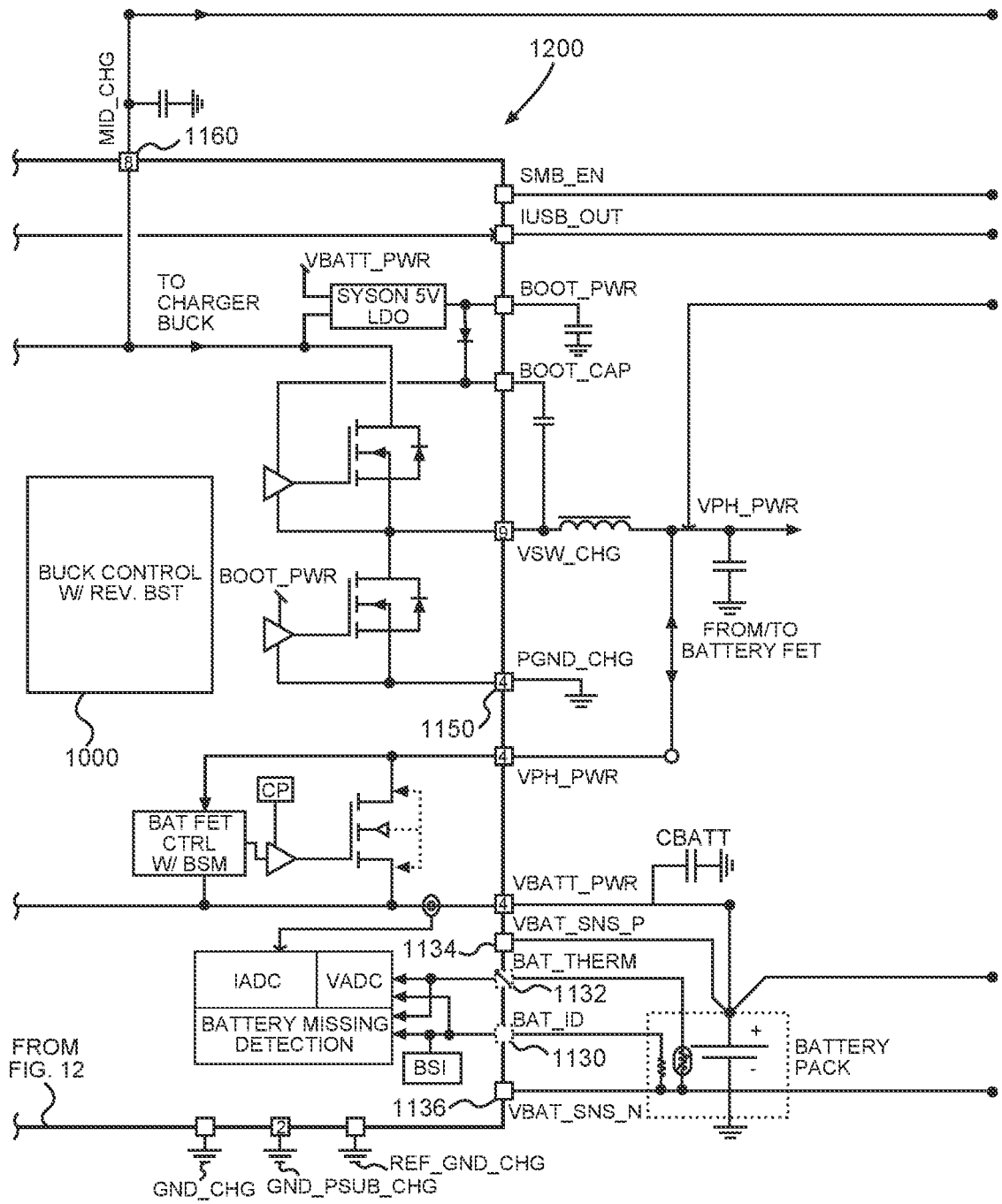

These pins can be seen in exemplary consolidated ICs in FIGS. 11 and 12. In particular, FIG. 11 illustrates an exemplary consolidated IC 1100 in situ relative to the USB Type-C receptacle 504. Pins from table 2 are illustrated. Note that not every pin from table 2 may be used. In the interests of completeness, the consolidated IC 1100 includes USB_IN pin 1102 (which may have an associated capacitor 1170 or other element as configured or desired), USP_DP (or +) 1104, USB_DN (or −) 1106, CC1_ID 1108, and CC2 1110 that connect to corresponding pins in the USB Type-C receptacle 504. Super-speed data lines (SSTx/Rx) may be coupled directly to a modem portion of the computing device from the USB Type-C receptacle 504. Note that D+ and D− may also be coupled to the modem. A CC_OUT pin 1112 may also be coupled to the modem. A VDD_VCONN pin 1114 may be coupled to an external (external to the consolidated IC 1100, but internal to the computing device) power source VCONN. The KPD_PWR_N pin 1116 may be coupled to a system power on trigger. The PB_EN pin 1118 is an output pin that couples to an EN pin of the pre-buck regulator (e.g., 520). The port control pin 1120 may couple other port control pins on other consolidated ICs to indicate when a power source is coupled to the consolidated IC 1100 through the USB Type-C receptacle 504. The CONN_THM pin 1122 receives a temperature reading from a thermistor 1172 while the SKIN_THM pin 1124 receives a temperature from a thermistor 1174. The LED driver pins 1158 drive LEDs 1176 to indicate whether the device is charging or receiving power or provide other indications as explained elsewhere. The REF_GND pin 1126 couples to a ground. The VBAT_SNS_N pin 1128 receives a negative differential battery voltage from the battery pack circuit 522. The BATT_ID pin 1130 receives a battery identification input as set by a resistor 1178 in the battery pack circuit 522. The BAT_THERM pin 1132 receives a temperature reading from a thermistor 1180 in the battery pack circuit 522. The VBAT_SNS_P pin 1134 receives a positive differential battery voltage from the battery pack circuit 522. Similarly, the IBATT_SNS_N pin 1136 receives a battery current sense value from the low side of a sense resistor 1182. Note that this sense resistor 1182 may be positioned inside the consolidated IC 1100 as described elsewhere. The IBATT_SNS_P pin 1138 receives a battery current sense value from the high side of the sense resistor 1182. The CHG_OUT pin 1140 is also coupled to the high side of the sense resistor 1182 and may provide a pre-charger output and/or battery trickle charge. The BATT_FET_CTRL pin 1142 couples to battery FETs 618(1)-618(2) (and to the CHG_OUT pin 1140 through a resistor 1184). The VSYS pin 1144 is a system power output node that also couples to the battery FETs 618(1)-618(2) and the input of the pre-regulator conditioning circuit 520. The BOOT_CAP2 pin 1146 couples to a capacitor 1186, which is equivalent to capacitor 512 of FIG. 5, as does VSW_BOOST pin 1148. The VSW_BOOST pin 1148 also couples to the inductor 508. The VSW_BOOST pin 1148 is active when the voltage conditioning circuit is in the boost mode. The PGRND_CHG pin 1150 provides a ground to the voltage conditioning circuit within the consolidated IC 1100. The VSW_BUCK pin 1152 is also coupled to the inductor 508 and is active when the voltage conditioning circuit is in the buck mode. The BOOT_CAP1 pin 1154 is coupled to a capacitor 1188, which is equivalent to capacitor 510 of FIG. 5. The VDD-CAP pin 1156 couples to a capacitor 1190 to provide an auxiliary low drop out (LDO) output. A MID_CHG pin 1160 couples to the charger for the voltage conditioning circuit within the consolidated IC 1100. As noted above, not every pin in the table is used in every consolidated IC.

Additionally, the circuits within the consolidated IC 1100 are shown in general relative proximity to input and output pins for the consolidated IC 1100. While this layout is one exemplary aspect, it should be appreciated that variations on the placement and/or the number of pins may still be within the scope of the appended claims. Likewise, it should be appreciated that while the battery pack circuit 522 shows two serial battery cells, the consolidated IC 1100 may be modified to include single cells or more than two battery cells without departing from the scope of the present disclosure.

FIG. 12 has many of the same pins performing similar functions and much of the same internal circuitry.

Figure 13:
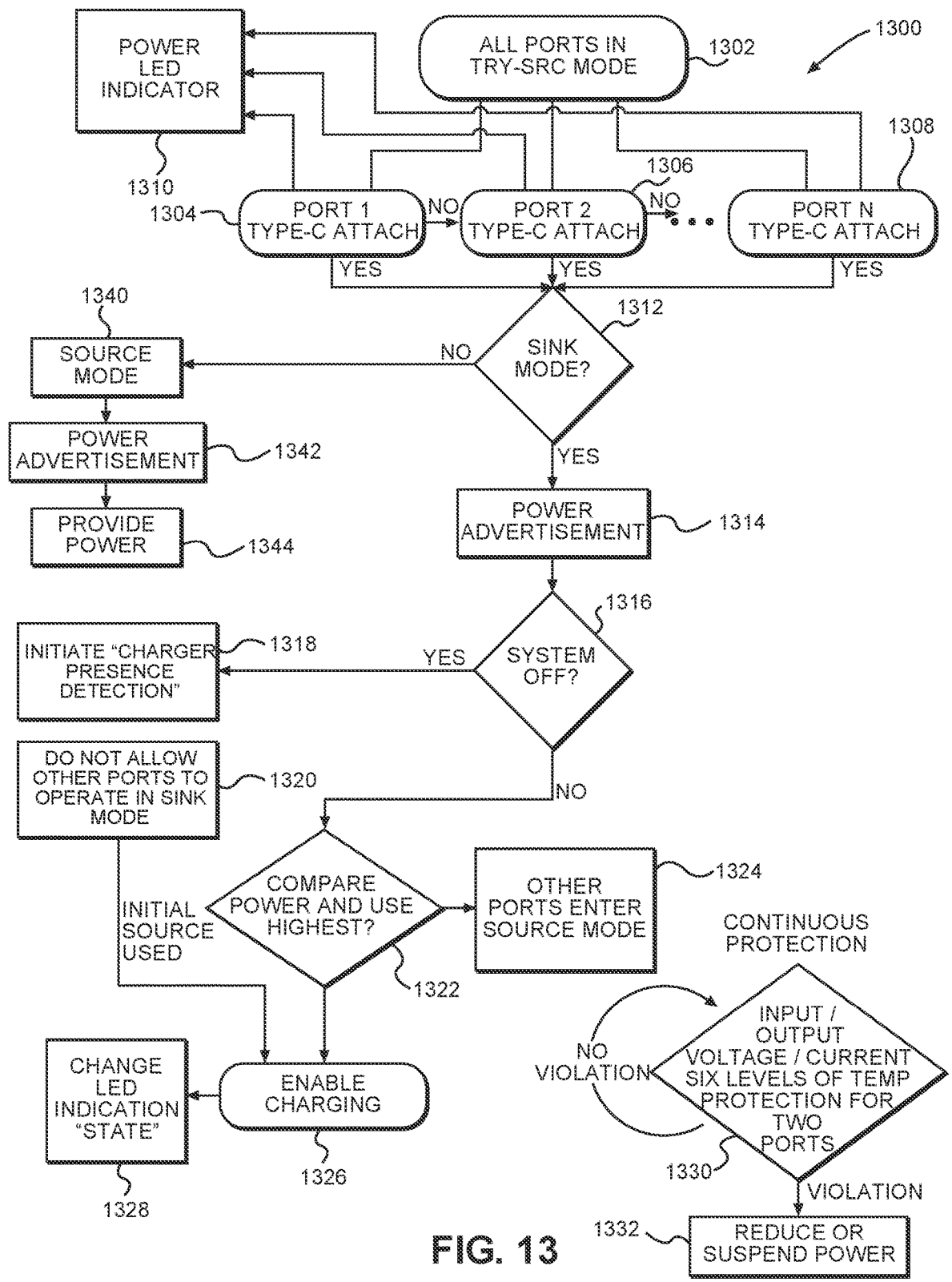
FIG. 13 is a flowchart showing a process associated with controlling multiple USB Type-C ports in a computing system.

FIG. 13 is a flowchart for the control of multiple consolidated ICs. In this regard, a process 1300 begins with all ports in TRY-SRC mode (block 1302), where each port is testing to determine if the port should be a source or a sink. A first port is attached (block 1304) (i.e., a connector is inserted into that port's receptacle). If the first port is not attached, a second port is attached (block 1306), and if the second port is not attached, at some point an nth port is attached (block 1308). Once a port is attached, power is provided to the LED indication for the respective port (block 1310). Implicit in the attachment step is that connectors may be inserted in any order and disconnected in any order. Likewise, while the process 1300 has begun for one port (e.g., port 1), a second port may detect attachment and concurrently proceed through the process 1300. Further, once a port detects an attachment, a determination is made whether the port enters a power sink mode (block 1312). If the answer to block 1312 is no, then the port enters a power source mode (block 1340), advertises power (block 1342), and supplies power (block 1344). If the answer is yes to block 1312, a respective power advertisement is made at the respective port (block 1314). A determination is made whether the system is off (block 1316). If the answer to block 1316 is yes, the system is off then the process 1300 initiates a charger presence detection (block 1318). This causes the other ports to be precluded from operating in a sink mode (block 1320). This command may be made by a TCPM or through the charger present detection line 620 of FIG. 6. In contrast, if the system is not off, the system can compare power being provided at the different ports and use the highest (block 1322). Again, the charger present detection line 620 may be used to prevent other ports from being the power sink. The ports remain in or enter a power source mode (block 1324). For the power sink, the initial port enables charging (block 1326) and changes the LED indication state (block 1328).

Also shown in FIG. 13 is a continuous protection process, where the input/output voltage/current and temperature are continuously monitored. For a two Type-C port implementation, six or more different thermal monitors (Type-C connectors, skin, die of each IC, battery) are available to ensure specific thermal profiles and optimization take place. (block 1330) As long as there is no violation, the monitoring continues. However, if a violation is detected, power is reduced or suspended (block 1332).

The USB Type-C and power delivery multi-port scalable power architecture according to aspects disclosed herein may be provided in or integrated into any processor-based device. Examples, without limitation, include a set top box, an entertainment unit, a power bank, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 14:
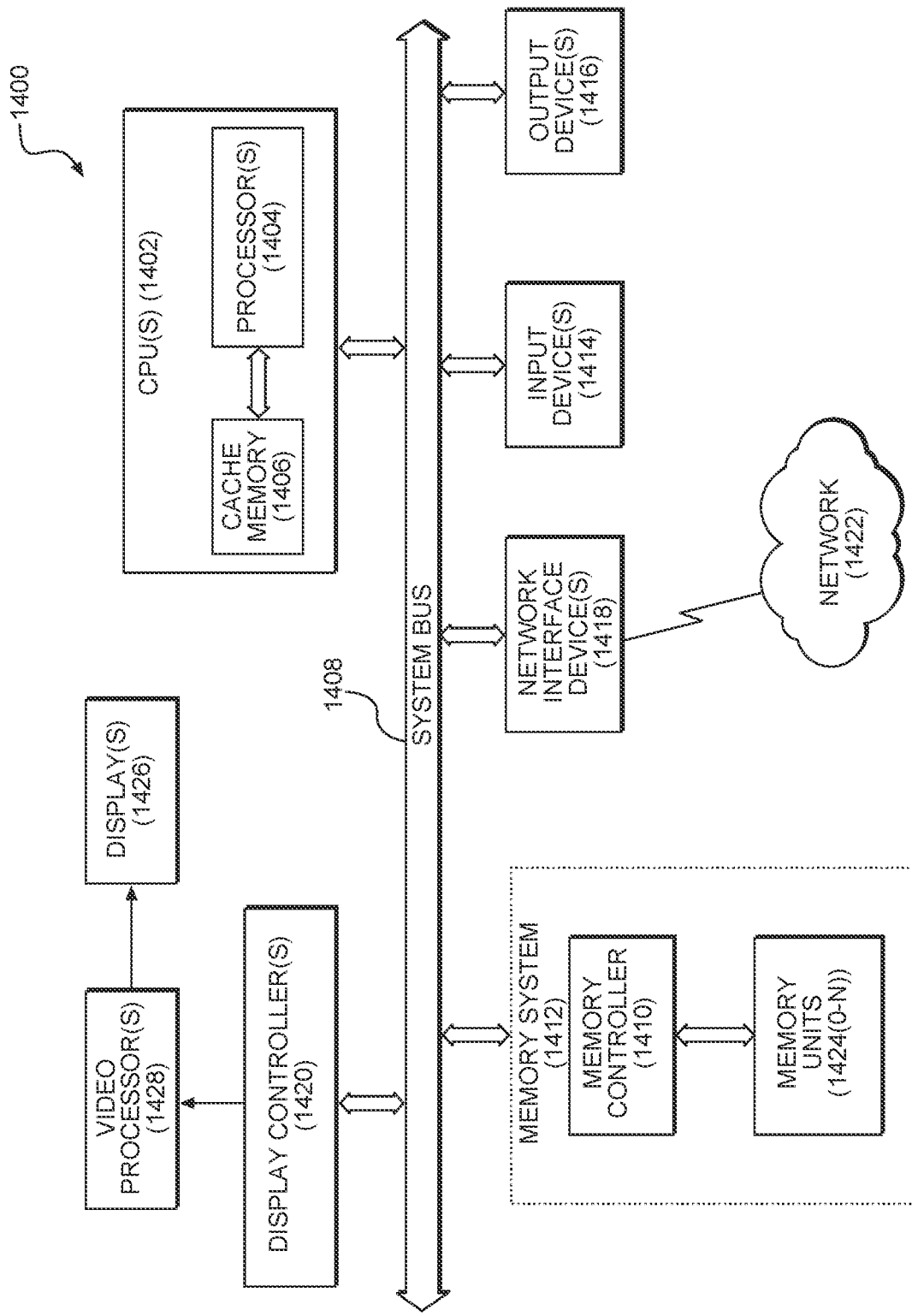
FIG. 14 is a block diagram of an exemplary processor-based system that can include the consolidated ICs of FIGS. 5 and 6.

In this regard, FIG. 14 illustrates an example of a processor-based system 1400 that can employ the consolidated ICs 502 and 602(1)-602(2) illustrated in FIGS. 5 and 6. In this example, the processor-based system 1400 includes one or more central processing units (CPUs) 1402, each including one or more processors 1404. The CPU(s) 1402 may have cache memory 1406 coupled to the processor(s) 1404 for rapid access to temporarily stored data. The CPU(s) 1402 is coupled to a system bus 1408 and can intercouple master and slave devices included in the processor-based system 1400. As is well known, the CPU(s) 1402 communicates with these other devices by exchanging address, control, and data information over the system bus 1408. For example, the CPU(s) 1402 can communicate bus transaction requests to a memory controller 1410 as an example of a slave device. Although not illustrated in FIG. 14, multiple system buses 1408 could be provided, wherein each system bus 1408 constitutes a different fabric.

Other master and slave devices can be connected to the system bus 1408. As illustrated in FIG. 14, these devices can include a memory system 1412, one or more input devices 1414, one or more output devices 1416, one or more network interface devices 1418, and one or more display controllers 1420, as examples. The input device(s) 1414 can include any type of input device, including, but not limited to, input keys, switches, voice processors, etc. The output device(s) 1416 can include any type of output device, including, but not limited to, audio, video, other visual indicators, etc. The network interface device(s) 1418 can be any devices configured to allow exchange of data to and from a network 1422. The network 1422 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1418 can be configured to support any type of communications protocol desired. The memory system 1412 can include one or more memory units 1424(0-N).

The CPU(s) 1402 may also be configured to access the display controller(s) 1420 over the system bus 1408 to control information sent to one or more displays 1426. The display controller(s) 1420 sends information to the display(s) 1426 to be displayed via one or more video processors 1428, which process the information to be displayed into a format suitable for the display(s) 1426. The display(s) 1426 can include any type of display, including, but not limited to, a cathode ray tube (CRT), a liquid crystal display (LCD), a plasma display, an LED display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of operating a multi-port universal serial bus (USB) device, comprising:
   detecting insertion at a first USB port;
   determining whether the first USB port is operating in a sink mode;
   upon determining the first USB port is not operating in the sink mode, placing the first USB port in a source mode, advertising power relative to the first USB port, and providing power relative to the first USB port;
   upon determining the first USB port is operating in the sink mode, advertising power relative to the first USB port and determining whether the USB device is on or off;
   upon determining the USB device is on, comparing power provided at the first USB port to power provided at least at a second USB port of the USB device; and
   maintaining the first USB port in the sink mode based at least in part on the USB device determining that the first USB port provides more power than other ports of the USB device, including at least the second USB port.

2. The method of claim 1, wherein each of the other ports of the USB device, including at least the second USB port, maintain or enter the source mode based at least in part on the USB device determining that the first USB port provides more power than the other ports of the USB device.

3. The method of claim 1, further comprising:
   enabling charging at the first USB port and changing an indication state of a light emitting diode (LED) of the USB device based at least in part on the USB device determining that the first USB port provides more power than the other ports of the USB device.

4. The method of claim 1, further comprising:
   upon determining the USB device is off, performing a charger presence detection.

5. The USB device of claim 4, wherein performing the charger presence detection maintains the first USB port in the sink mode and precludes other USB ports of the USB device from operating as power sinks.

6. The method of claim 4, wherein a USB type-C port manager of the USB device performs the charger presence detection.

7. The method of claim 4, wherein the USB device performs the charger presence detection via a charger presence detection line between a first consolidated integrated circuit (IC) of the USB device and a second consolidated IC of the USB device, wherein the first consolidated IC or the second consolidated IC, or each comprises:
   a USB port circuit;
   a battery charger circuit comprising a buck-boost circuit;
   an integrated sense resistor configured to connect to a battery pack circuit having at least two serially-arranged battery cells; and
   a battery field effect transistor (FET) configured to connect to the battery pack circuit having the at least two serially-arranged battery cells.

8. The method of claim 7, further comprising:
   limiting current into the first consolidated IC via the battery FET of the first consolidated IC, the battery FET configured to connect to the battery pack circuit having the at least two serially-arranged battery cells, wherein the first consolidated IC comprises at least two FETs, including the battery FET.

9. The method of claim 7, further comprising:
   limiting current into the at least two serially-arranged battery cells via the battery FET.

10. An apparatus, comprising:
    a processor;
    memory coupled with the processor; and
    instructions stored in the memory and executable by the processor to cause the apparatus to:
    detect insertion at a first USB port;
    determine whether the first USB port is operating in a sink mode;
    upon determining the first USB port is not operating in the sink mode, place the first USB port in a source mode, advertising power relative to the first USB port, and providing power relative to the first USB port;
    upon determining the first USB port is operating in the sink mode, advertise power relative to the first USB port and determining whether the apparatus is on or off;
    compare, upon determining the apparatus is on, power provided at the first USB port to power provided at least at a second USB port of the apparatus; and
    maintain the first USB port in the sink mode based at least in part on the apparatus determining that the first USB port provides more power than other ports of the apparatus, including at least the second USB port.

11. The apparatus of claim 10, wherein each of the other ports of the apparatus, including at least the second USB port, maintain or enter the source mode based at least in part on the apparatus determining that the first USB port provides more power than the other ports of the apparatus.

12. The apparatus of claim 10, wherein the instructions are further executable by the processor to cause the apparatus to:
    enable charging at the first USB port and changing an indication state of a light emitting diode (LED) of the apparatus based at least in part on the apparatus determining that the first USB port provides more power than the other ports of the apparatus.

13. The apparatus of claim 10, wherein the instructions are further executable by the processor to cause the apparatus to:
perform, upon determining the apparatus is off, a charger presence detection.

14. The apparatus of claim 13, wherein performing the charger presence detection maintains the first USB port in the sink mode and precludes other USB ports of the apparatus from operating as power sinks.

15. The apparatus of claim 13, wherein a USB type-C port manager of the apparatus performs the charger presence detection.

16. The apparatus of claim 13, wherein the apparatus performs the charger presence detection via a charger presence detection line between a first consolidated integrated circuit (IC) of the apparatus and a second consolidated IC of the apparatus, wherein the first consolidated IC or the second consolidated IC, or each comprises:
a USB port circuit;
a battery charger circuit comprising a buck-boost circuit;
an integrated sense resistor configured to connect to a battery pack circuit having at least two serially-arranged battery cells; and
a battery field effect transistor (FET) configured to connect to the battery pack circuit having the at least two serially-arranged battery cells.

17. The apparatus of claim 16, wherein the instructions are further executable by the processor to cause the apparatus to:
limit current into the first consolidated IC via the battery FET of the first consolidated IC, the battery FET configured to connect to the battery pack circuit having the at least two serially-arranged battery cells, wherein the first consolidated IC comprises at least two FETs, including the battery FET.

18. The apparatus of claim 16, wherein the instructions are further executable by the processor to cause the apparatus to:
limit current into the at least two serially-arranged battery cells via the battery FET.

19. An apparatus, comprising:
means for detecting insertion at a first USB port;
means for determining whether the first USB port is operating in a sink mode;
means for upon determining the first USB port is not operating in the sink mode, placing the first USB port in a source mode, advertising power relative to the first USB port, and providing power relative to the first USB port;
means for upon determining the first USB port is operating in the sink mode, advertising power relative to the first USB port and determining whether the apparatus is on or off;
means for upon determining the apparatus is on, comparing power provided at the first USB port to power provided at least at a second USB port of the apparatus; and
means for maintaining the first USB port in the sink mode based at least in part on the apparatus determining that the first USB port provides more power than other ports of the apparatus, including at least the second USB port.

20. The apparatus of claim 19, wherein each of the other ports of the apparatus, including at least the second USB port, maintain or enter the source mode based at least in part on the apparatus determining that the first USB port provides more power than the other ports of the apparatus.

21. The apparatus of claim 19, further comprising:
means for enabling charging at the first USB port and changing an indication state of a light emitting diode (LED) of the apparatus based at least in part on the apparatus determining that the first USB port provides more power than the other ports of the apparatus.

22. The apparatus of claim 19, further comprising:
means for upon determining the apparatus is off, performing a charger presence detection.

23. The apparatus of claim 22, wherein performing the charger presence detection maintains the first USB port in the sink mode and precludes other USB ports of the apparatus from operating as power sinks.

24. The apparatus of claim 22, wherein a USB type-C port manager of the apparatus performs the charger presence detection.

25. The apparatus of claim 22, wherein the apparatus performs the charger presence detection via a charger presence detection line between a first consolidated integrated circuit (IC) of the apparatus and a second consolidated IC, wherein the first consolidated IC or the second consolidated IC, or each comprises:
a USB port circuit;
a battery charger circuit comprising a buck-boost circuit;
an integrated sense resistor configured to connect to a battery pack circuit having at least two serially-arranged battery cells; and
a battery field effect transistor (FET) configured to connect to the battery pack circuit having the at least two serially-arranged battery cells.

26. The apparatus of claim 25, further comprising:
means for limiting current into the first consolidated IC via the battery FET of the first consolidated IC, the battery FET configured to connect to the battery pack circuit having the at least two serially-arranged battery cells, wherein the first consolidated IC comprises at least two FETs, including the battery FET.

27. A non-transitory computer-readable medium storing code, the code comprising instructions executable by a processor of a multi-port universal serial bus (USB) device to:
detect insertion at a first USB port;
determine whether the first USB port is operating in a sink mode;
upon determining the first USB port is not operating in the sink mode, place the first USB port in a source mode, advertising power relative to the first USB port, and providing power relative to the first USB port;
upon determining the first USB port is operating in the sink mode, advertise power relative to the first USB port and determining whether the USB device is on or off;
compare, upon determining the apparatus is on, power provided at the first USB port to power provided at least at a second USB port of the apparatus; and
maintain the first USB port in the sink mode based at least in part on the apparatus determining that the first USB port provides more power than other ports of the apparatus, including at least the second USB port.

28. The non-transitory computer-readable medium of claim 27, wherein each of the other ports of the apparatus, including at least the second USB port, maintain or enter the source mode based at least in part on the apparatus determining that the first USB port provides more power than the other ports of the apparatus.

29. The non-transitory computer-readable medium of claim 27, wherein the instructions are further executable by the processor to:

enable charging at the first USB port and changing an indication state of a light emitting diode (LED) of the apparatus based at least in part on the apparatus determining that the first USB port provides more power than the other ports of the apparatus.

30. The non-transitory computer-readable medium of claim 27, wherein the instructions are further executable by the processor to:

perform, upon determining the apparatus is off, a charger presence detection.

\* \* \* \* \*